United States Patent
Gangoli et al.

(10) Patent No.: US 9,657,945 B2
(45) Date of Patent: *May 23, 2017

(54) SELECTIVE OXY-FUEL BOOST BURNER SYSTEM AND METHOD FOR A REGENERATIVE FURNACE

(71) Applicant: AIR PRODUCTS AND CHEMICALS, INC., Allentown, PA (US)

(72) Inventors: Shailesh Pradeep Gangoli, Easton, PA (US); Russell James Hewertson, Wescosville, PA (US); Anup Vasant Sane, Allentown, PA (US); John C. Palazzolo, Eastchester, NY (US); Xiaoyi He, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 202 days.

This patent is subject to a terminal disclaimer.

(21) Appl. No.: 14/721,297

(22) Filed: May 26, 2015

(65) Prior Publication Data
US 2016/0348904 A1    Dec. 1, 2016

(51) Int. Cl.
*F23C 5/08* (2006.01)
*F23L 7/00* (2006.01)
*F23N 1/00* (2006.01)
*F23N 3/00* (2006.01)
*F23D 14/32* (2006.01)
(Continued)

(52) U.S. Cl.
CPC ............ *F23L 7/007* (2013.01); *C21B 9/14* (2013.01); *F23C 5/08* (2013.01); *F23D 14/32* (2013.01);
(Continued)

(58) Field of Classification Search
CPC .... F23F 14/32; F23C 5/08; C21B 9/14; F23N 1/00; F23N 3/00

USPC .............................. 431/8, 9, 10, 76; 110/261
See application file for complete search history.

(56) References Cited

U.S. PATENT DOCUMENTS 5,575,637 A    11/1996   Slavejkov et al.
5,611,682 A     3/1997   Slavejkov et al.
(Continued)

FOREIGN PATENT DOCUMENTS

EP    2913586    9/2015

OTHER PUBLICATIONS

Sane, Anup Vasant, U.S. Appl. No. 14/193,698, entitled "Transient Heating Burner and Method", filed Feb. 28, 2014.

*Primary Examiner* — Gregory Huson
*Assistant Examiner* — Nikhil Mashruwala
(74) *Attorney, Agent, or Firm* — Larry S. Zelson

(57) ABSTRACT

An oxy-fuel boost burner for a regenerative furnace having a pair of regenerator ports configured to alternately fire into and exhaust from the furnace, including at least one burner element corresponding to each of the regenerator ports by being positioned to fire into a complimentary region of the furnace, each burner element including a selective distribution nozzle configured to flow a first reactant and a proportional distribution nozzle configured to flow a second reactant, and a controller programmed to identify which regenerator port is currently firing and which is currently exhausting and to independently control the first reactant flow to each selective distribution nozzle such that the at least one burner element corresponding to the currently firing regenerator port has a greater than average first reactant flow and the at least one burner element corresponding to the currently exhausting regenerator port as a less than average first reactant flow.

14 Claims, 18 Drawing Sheets

(51) Int. Cl.
  *F27B 9/30*   (2006.01)
  *C21B 9/14*   (2006.01)
  *F27D 17/00*  (2006.01)
  *F27D 19/00*  (2006.01)
(52) U.S. Cl.
  CPC ............. *F23N 1/002* (2013.01); *F23N 3/002* (2013.01); *F27B 9/3044* (2013.01); *F27D 17/004* (2013.01); F23C 2201/20 (2013.01); F23C 2900/05081 (2013.01); F23C 2900/06041 (2013.01); F23D 2900/00006 (2013.01); F27D 2017/007 (2013.01); F27D 2019/0031 (2013.01); F27D 2019/0034 (2013.01)

(56) References Cited

U.S. PATENT DOCUMENTS

| | | | | |
|---|---|---|---|---|
| 6,079,229 | A * | 6/2000 | Legiret | C03B 5/235 431/8 |
| 6,113,389 | A * | 9/2000 | Joshi | C03B 5/2353 431/11 |
| 6,126,440 | A * | 10/2000 | Argent | C03B 5/2353 110/347 |
| 6,519,973 | B1 * | 2/2003 | Hoke, Jr. | C03B 5/235 110/297 |
| 6,866,503 | B2 | 3/2005 | Ladharam | |
| 8,851,883 | B2 * | 10/2014 | Jarry | C03B 5/2353 126/99 R |
| 9,206,979 | B2 * | 12/2015 | Cole | F23C 5/28 |
| 2003/0054301 | A1 * | 3/2003 | Borders | F23D 14/22 431/8 |
| 2010/0077944 | A1 * | 4/2010 | Slavejkov | F23C 6/04 110/345 |
| 2010/0242545 | A1 | 9/2010 | Richardson | |
| 2013/0091898 | A1 | 4/2013 | Mieth et al. | |
| 2013/0095437 | A1 | 4/2013 | Buragino et al. | |
| 2013/0143168 | A1 | 6/2013 | Gangoli et al. | |
| 2014/0305355 | A1 | 10/2014 | D'Agostini et al. | |
| 2016/0348970 | A1 * | 12/2016 | Gangoli | F23D 14/46 |

\* cited by examiner

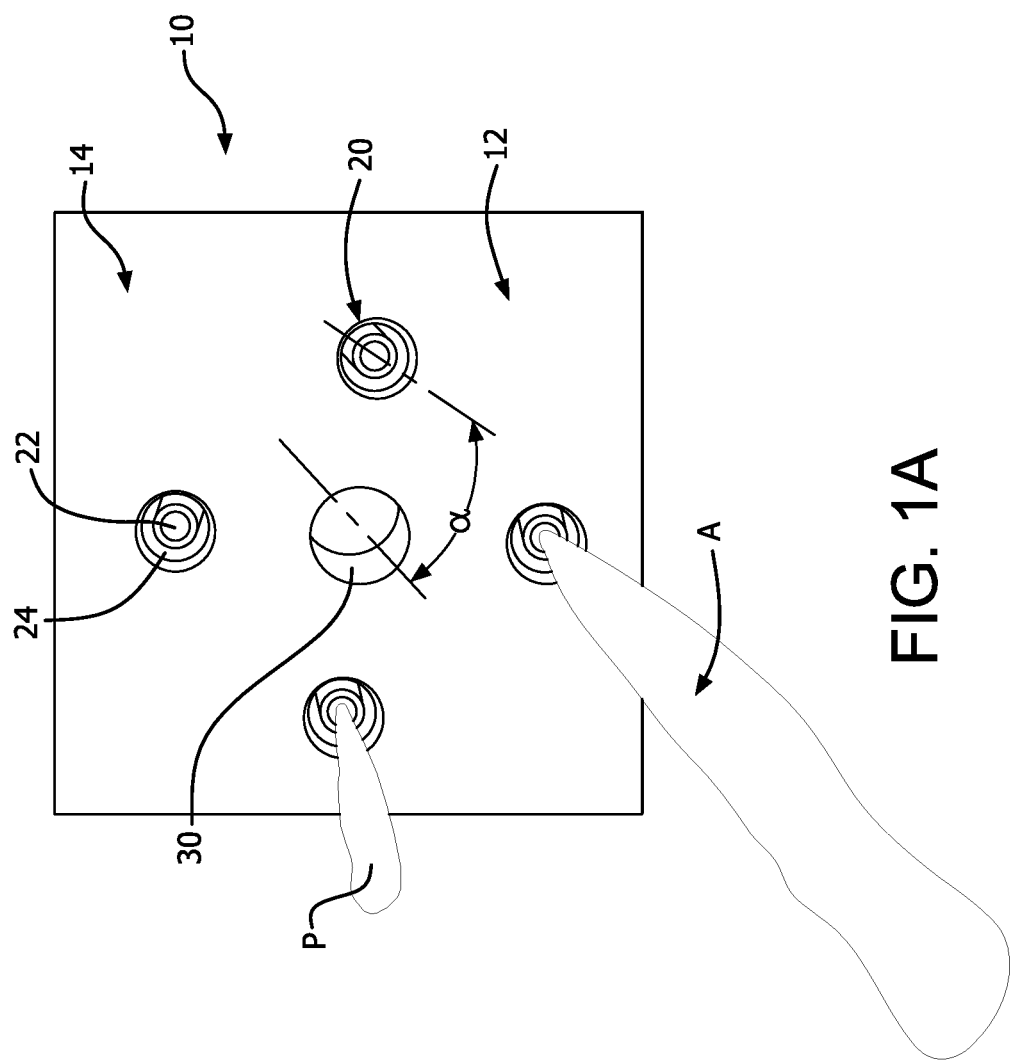

SELECTIVE OXY-FUEL BOOST BURNER SYSTEM AND METHOD FOR A REGENERATIVE FURNACE

BACKGROUND

This application relates to a system of employing one or more oxy-fuel burners in a regenerative furnace and methods for operating such burners in a regenerative furnace, to provide enhanced heat transfer while improving uniformity of heating and reducing potential formation of nitrogen oxides (NOx).

In a conventional regenerative furnace system, air-fuel burners are used in alternately firing pairs to recover energy from the flue gas of the first of the paired burners by preheating the air used during the operation of the second of the paired burners. In particular, a capacitive heat exchanger (e.g., refractory material) is used to absorb energy (as heat) from the flue gas while the first burner is firing and to then release that energy (as heat) to the air flow to the second burner, and vice-versa. While the each burner is firing, the other burner's air passage serves as the flue gas duct, and includes the capacitive heat exchanger, and the burners cycle back and forth periodically between firing as a burner and serving as the flue gas duct.

One example of the configuration of an end-port regenerative furnace 100 is shown in FIG. 9. The furnace is typically operated regeneratively using two burner ports 110, 130 alternately acting as burner and flue. The furnace is bounded a front wall 102, a back wall 120, and a first sidewall 114 and a second sidewall 134 each extending from the from the front wall 102 to the back wall 120, as well as a roof (not shown). A charge of material to be melted, such as glass or metal, is loaded into and positioned within the furnace 100.

In an end-port configuration, a first regenerator port 110 and a second regenerator port 130 are mounted in the front wall 102. In a first mode of operation, fuel and air are supplied to the first regenerator port 110 and combusted in the furnace 10, while hot combustion products are exhausted as flue gases via the air supply opening of the second regenerator port 130. The combustion gases travel a generally U-shaped path in the furnace 100. In a second mode of operation, fuel and air are supplied to the second regenerator port 130 and combusted in the furnace 100, while hot combustion products are exhausted as flue gases via the air supply opening of the first regenerator port 110. A flue (not shown) may be positioned in the furnace 100 to assist in creating a draft to maintain the U-shaped flow pattern. Furnace operation is alternated between the first mode and the second mode, such that the regenerator ports 110, 130 are cyclically operated as burner port and exhaust gas port, with a switch between the two modes occurring on a set time scale, such as every 10 to 30 minutes. A heat exchanger (also referred to as a regenerator) is positioned in each regenerator port 110, 130 so that air flowing inwardly through the regenerator port and exhaust flowing outwardly through the regenerator port pass across the heat exchanger, thereby preheating the incoming air with heat recovered from the departing exhaust.

Given the paired or alternate firing configuration of a regenerative furnace, it is sometimes difficult to optimally position the paired burners in a melting/heating process so as to obtain uniform heating. To ensure most flue gases exit through the second regenerator port while the first regenerator port is firing, a draft is introduced, which can result in short circuiting of flue gas and potential non-uniformities in energy distribution. For example, cold spots 122 may exist in the furnace 100 that result in extended cycle times. Such cold spots are common at the base of the U-shaped path, particularly in a furnace 100 that is relatively long compared to its width and compared to the regions reached by the flames emanating from the regenerator port burners 110, 130.

Strategically located oxy-fuel burners can provide an energy boost in the furnace, targeted at those cold spots, to improve heating uniformity, efficiency, and productivity, without significantly increasing the volume of flue gas. As with other uses of oxygen enrichment in an air-fuel furnace, increased combustion efficiency and higher flame temperatures may be beneficial. However, introduction of oxy-fuel burners into an air-fuel fired furnace may also detrimentally increase NOx emissions. See "Oxygen-Enhanced Combustion," Charles E. Baukal, ed., CRC Press, 1998 (p. 48, FIG. 2.1) describing a peak in NOx near 45-50% oxygen in the oxidizer, with a drop in NOx at higher than 55% oxygen in the oxidizer as a result of lower nitrogen concentration in the oxidizer. Prior attempts to utilize oxygen enrichment in air-fuel fired regenerative furnaces have not overcome this problem.

SUMMARY

A selective boost burner system and method is provided to enhance flame coverage and view factors in a furnace, and to enable a reduction in cold spots and thus more uniform furnace heating. As defined herein, an oxy-fuel boost burner may provide from 1% to 90% of the combustion energy to the furnace, or in various embodiments, at least 5%, at least 10%, at least 20%, at least 30%, or at least 40%; or less than 90%, less than 80%, less than 70%, less than 60%, or less than 50%; or an combination of the foregoing upper and lower limits. The configuration of the burner enables optimum heat flux delivery both spatially and temporally so that a uniform temperature distribution can be achieved and maintained in a furnace. Uniform heat flux is achieved by directing the heat flux to appropriate locations, for example as determined by an algorithm, based on furnace geometry, or based on real-time feedback from one or more sensors, for certain amounts of time. The burner and method enable selectively longer and more penetrating flames that can impinge the charge in a furnace to provide improved melting, while minimizing oxidative melt losses. In particular, multiple high momentum flames are directed towards the melt in a cyclical manner. Overheating is avoided and energy is distributed more evenly over the melt bath. The burner has a plurality of separate burner elements, located either in one house or split among more than one housing. Each burner element has its own flame in a passive or active state that can be modulated in various patterns and frequencies to achieve the desired heat flux profile. Each active flame is associated with a flame region in the furnace.

As described herein, oxy-fuel combustion as delivered by the selective boost burner is modulated to mimic or be synchronized with the cyclical operation of a regenerative furnace. This can be achieved using a single boost burner or plurality of boost burners installed strategically in the furnace relative to the regenerator burners to deliver energy according to the needs of the furnace while minimizing the interaction between the oxy-fuel boost flames and the air-fuel regenerator flames in the furnace.

Various embodiments of a boost burner system are described.

Aspect 1: An oxy-fuel boost burner for a regenerative furnace having a pair of regenerator ports configured to alternately fire into and exhaust from the furnace, the boost burner comprising: at least two burner elements, wherein at least one of the burner elements corresponds to each of the regenerator ports such that a regenerator port and its corresponding at least one burner element are positioned to fire into complimentary regions of the furnace, each burner element comprising: a selective distribution nozzle configured to flow a first reactant; and a proportional distribution nozzle configured to flow a second reactant; and a controller programmed: to identify which regenerator port is currently firing and which regenerator port is currently exhausting; and to independently control the first reactant flow to each distribution nozzle such that the at least one burner element corresponding to the currently firing regenerator port is active and the at least one burner element corresponding to the currently exhausting regenerator port is passive, wherein first reactant flow in the selective distribution nozzle of an active burner element is greater than an average first reactant flow to the selective distribution nozzles and fuel flow in the selective distribution nozzle of a passive burner element is less than the average first reactant flow to the selective distribution nozzles, and wherein the first reactant is one of a fuel and an oxidant and wherein the second reactant is the other of a fuel and an oxidant.

Aspect 2: The boost burner of Aspect 1, wherein the proportional distribution nozzle is an annular nozzle surrounding the selective distribution nozzle.

Aspect 3: The boost burner of Aspect 1 or 2, wherein the first reactant is a fuel and the second reactant is an oxidant.

Aspect 3a: The boost burner of Aspect 1 or 2, wherein the first reactant is an oxidant and the second reactant is a fuel.

Aspect 4: The boost burner of Aspect 3, further comprising: at least one staging nozzle spaced apart from each of the burner elements and configured to flow a secondary oxidant; wherein the controller is further programmed to control a staging ratio to be less than or equal to about 75%, wherein the staging ratio is the ratio of the oxygen contained in the secondary oxidant flow to the sum of the oxidant flowed through the proportional distribution nozzles and the staging nozzle.

Aspect 5: The boost burner of Aspect 1 to 4, wherein the regenerator ports are mounted in an end wall of the furnace, and wherein the boost burner is mounted in an opposite end wall of the furnace.

Aspect 6: The boost burner of Aspect 1 to 4, wherein the regenerator ports are positioned in opposite sidewalls near an end wall of the furnace, each regenerator port being at a non-perpendicular angle to its respective sidewall, and wherein the boost burner is mounted in an opposite end wall of the furnace.

Aspect 7: The boost burner of Aspect 1 to 4, wherein the regenerator ports are positioned in opposite sidewalls near an end wall of the furnace, each regenerator port being at a non-perpendicular angle to its respective sidewall, and wherein the boost burner is mounted in a roof of the furnace.

Aspect 8: The boost burner of Aspect 1, wherein the burner elements are mounted in the same housing.

Aspect 9: The boost burner of Aspect 1, wherein at least one of the burner elements is mounted in a separate housing from at least one other of the burner elements.

Aspect 10: The boost burner of Aspect 1, wherein the controller is programmed to control first reactant flow to a passive selective distribution nozzle to be greater than zero and less than or equal to half the first reactant flow rate of an active selective distribution nozzle.

Aspect 11: The boost burner of Aspect 1, wherein the oxidant flowing through the burner elements has an oxygen concentration of equal to or greater than about 70%.

Aspect 12: The boost burner of Aspect 1, wherein the selective distribution nozzle of an active burner element has an active jet flow rate and wherein the selective distribution nozzle of a passive burner element has a passive jet flow rate; and wherein the controller is programmed to control the ratio of the active jet flow rate to the passive jet flow rate to be from about 5 to about 40.

Aspect 13: The boost burner of Aspect 1, wherein a passive burner element has an equivalence ratio of from about 0.2 to about 1, and wherein an active burner element has an equivalence ratio of from about 1 to about 10, wherein the equivalence ratio is the ratio of theoretical stoichiometric oxidant flow required to combustion the actual fuel flow through the burner element to actual oxidant flow through the burner element.

Aspect 14: A regenerative furnace having first and second end walls, first and second sidewalls joining the end walls, a roof, and a chamber bounded by the end walls, the sidewalls, and the roof, the furnace comprising: a pair of regenerator ports configured to alternately fire into and exhaust from the chamber, each regenerator port defining a flame zone extending into the chamber from said regenerator port; an oxy-boost burner comprising at least two burner elements, each burner element defining a flame zone extending into the chamber from said burner element, such that at least one burner element defines a flame zone that does not substantially overlap the flame zone defined by each one of the regenerator ports, each burner element comprising: a selective distribution nozzle configured to flow a first reactant; and a proportional distribution nozzle configured to flow a second reactant; and a controller programmed to: identify which regenerator port is currently firing and which regenerator port is currently exhausting; to designated as active the at least one burner element having a flame zone that does not substantially overlap the flame zone of the currently firing regenerator port and to designate as passive the remaining burner elements; and to independently control the first reactant flow to the selective distribution nozzle of each active burner element to be greater than an average first reactant flow to the selective distribution nozzles and the first flow to the selective distribution nozzle of each passive burner element to be less than the average first reactant flow to the selective distribution nozzles, and wherein the first reactant is one of a fuel and an oxidant and wherein the second reactant is the other of a fuel and an oxidant.

Aspect 15: A method of operating a boost burner in a regenerative furnace having a pair of regenerator ports configured to alternately fire into and exhaust from the furnace, the burner having at least two burner elements each comprising a selective distribution nozzle proximate to a proportional distribution nozzle, the burner further having a controller programmed to independently control first reactant flow to the selective distribution nozzle of each burner element, the method comprising: flowing a second reactant at a second reactant flow rate through each of the proportional distribution nozzles; identifying which regenerator port is currently firing and which regenerator port is current exhausting; selecting at least one of the selective distribution nozzles to be active and at least one of the selective distribution nozzles to be passive, the at least one active selective distribution nozzle having a flame zone that is complimentary to a flame zone of the regenerator port currently firing; flowing the first reactant at an active jet flow rate through the at least one active selective distribution nozzle; and flowing the first reactant at a passive jet flow rate through the at least one passive selective distribution nozzle; wherein the active jet flow rate is greater than an average first reactant flow rate through the selective distribution nozzles and the passive jet flow rate is less than the average first reactant flow rate through the selective distribution nozzles, and wherein the first reactant is one of a fuel and an oxidant and wherein the second reactant is the other of a fuel and an oxidant.

Aspect 16: The boost burner of Aspect 1, wherein the burner elements are positioned collinearly.

Aspect 17: The boost burner of Aspect 16, further comprising a staging nozzle between each adjacent pair of burner elements, with each staging nozzle located substantially equidistant between two burner elements.

Other aspects of the invention are described below.

BRIEF DESCRIPTION OF THE DRAWINGS

FIG. 1A is an end perspective view of an embodiment of a selective boost burner with oxidant staging.

FIG. 5A(a) shows a burner having a central staging nozzle surrounded by four burner elements angled radially outward; FIG. 5A(b) shows a burner having a central staging nozzle surrounded by four burner elements angled tangentially along a circumscribed circle; FIG. 5A(c) shows a burner having a collinear arrangement of alternating burner elements and staging nozzles in which all but the central staging nozzle are angled outward; FIG. 5A(d) shows a burner having four collinear burner elements adjacent to and substantially parallel to the major axis of a slotted staging nozzle; and FIG. 5A(e) shows a pair of aligned flat flame burner elements and a pair of collinear staging nozzles adjacent to and substantially parallel to the major axis of each burner element.

FIG. 5B(a) shows a burner having four burner elements angled radially outward; FIG. 5B(b) shows a burner having four burner elements angled tangentially along a circumscribed circle; FIG. 5B(c) shows a burner having a two collinear burner elements each angled outward away from the other burner; FIG. 5B(d) shows a burner having four collinear burner elements angled outward in adjacent pairs from the other adjacent pair; and FIG. 5B(e) shows a pair of aligned flat flame burner elements. FIG. 5B(f) shows a burner having multiple rows of co-linear burner elements.

DETAILED DESCRIPTION

Figure 1B:
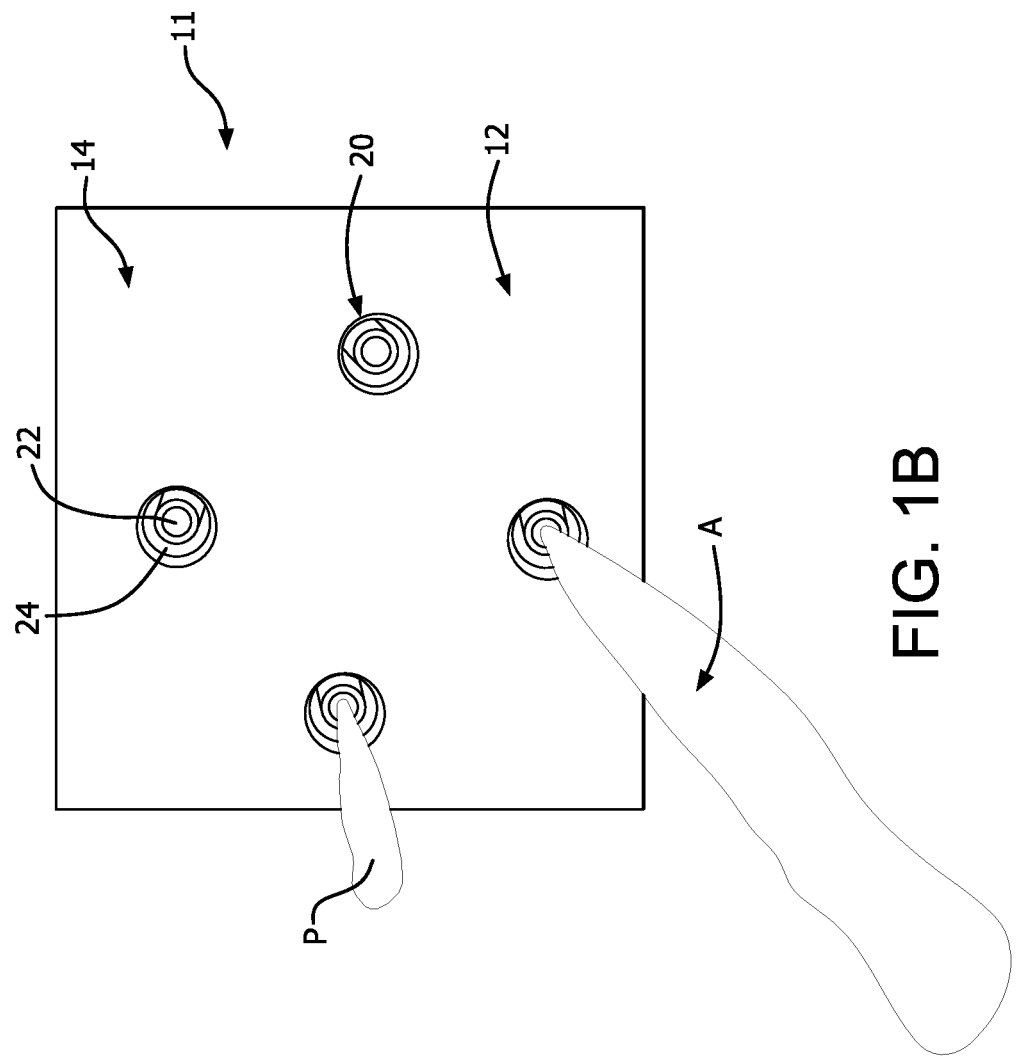
FIG. 1B is an end perspective view of an embodiment of a selective boost burner without oxidant staging.

FIG. 1A depicts an embodiment of a selective boost burner 10 having staging of one reactant (i.e., a "staged burner"), while FIG. 1B depicts an embodiment of a selective boost burner 11 without staging of either reactant (i.e., an non-staged burner"). The burners 10 and 11 each include a body 12 having a face 14, wherein when the burner 10 or 11 is mounted in a furnace (for example as in FIG. 7 or in FIGS. 11-15), the face 14 is exposed to the combustion zone in the furnace.

Figure 4:
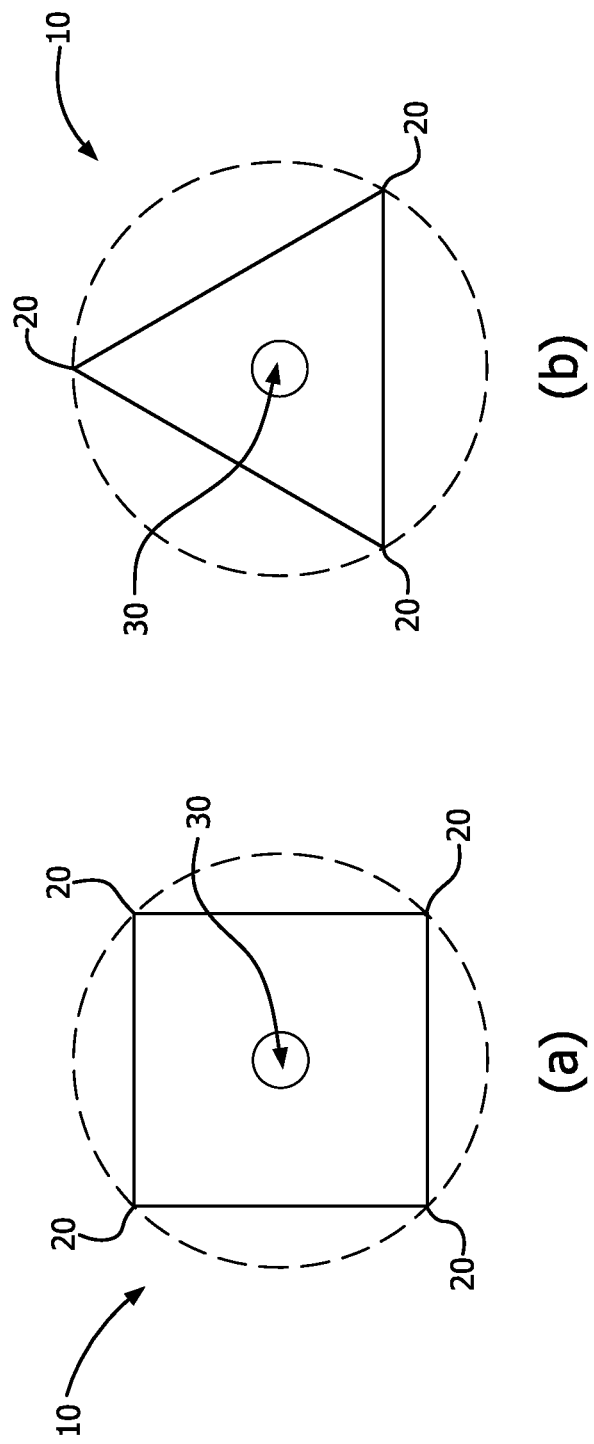
FIG. 4 is an end view schematic showing nozzle orientations for two embodiments of a selective boost burner.

The non-staged burner 11 includes a plurality of burner elements 20 oriented so as to define a circumscribed circle (see FIG. 4), with the burner elements 20 preferably equally spaced around the circumscribed circle. The staged burner 10 further includes at least one staging nozzle 30 positioned within the circumscribed circle. For reference purposes, an active jet (A) and a passive jet (P) are depicted, to show that the active jet has a larger flame than the passive jet.

Figure 5A:
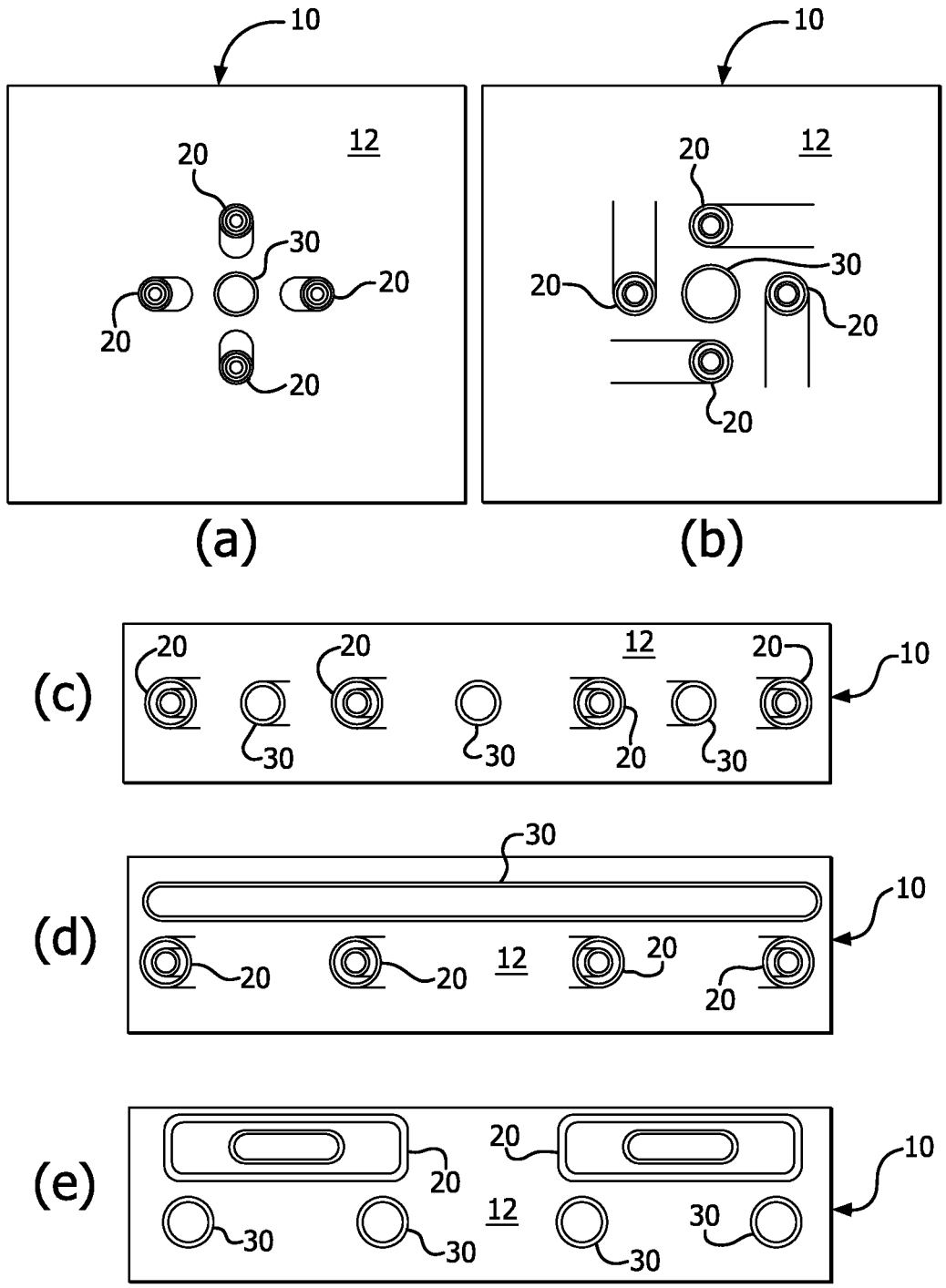
FIGS. 5A(a)-5A(e) are end views of various embodiments of a selective boost burner with staging.

The burners 10 and 11 depicted in FIGS. 1A and 1B, respectively, each have four burner elements 20 spaced apart at approximately 90° intervals. However, it is understood that the burner 10 or 11 may include any number n of burner elements 20 equal to or greater than two. For example, a burner 10 or 11 may have two burner elements 20 spaced so as to be diametrically opposed (as shown in FIGS. 5A(d) and 5B(d)), or alternately three burner elements 20 spaced apart at approximately 120° intervals, or five or more burner elements 20 spaced apart at approximately even intervals. It is also understood that for some furnace geometries, configurations, or operating conditions, it may be desirable to have a burner 10 or 11 with a plurality of burner elements 20 that are unequally spaced apart around the circumscribed circle. In a further alternative, the burner 10 or 11 may have a plurality of burner elements 20 that are positioned to define a geometric shape other than a circle, for example an oval or an irregular polygon, depending on the furnace geometry and configuration.

In addition, the non-staged burner 11 may include two or more burner elements 20 that are positioned in multiple housings at different locations in a furnace, instead of all burner elements 20 being in the same housing, but are operated in a coordinated selective manner as is described herein.

The staged burner 10 of FIG. 1A has one centrally positioned staging nozzle 30. However, it is understood that a plurality of staging nozzles 30 may be provided, wherein the staging nozzles 30 may be all of the same size or of different sizes. Additionally, depending on furnace geometry, desired flame characteristics, the orientation of the individual burner elements 20, and other factors, the staging nozzle(s) 30 may be positioned off center within the circumscribed circle defined by the burner elements 20. The staging nozzle 30 may be of any shape.

In the both the staged burner 10 and the non-staged burner 11, each burner element 20 includes a selective distribution nozzle 22 surrounded by an annular proportional distribution nozzle 24. A selectively distributed reactant is flowed through the selective distribution nozzle 22 while a proportionally distributed reactant is flowed through the annular proportional distribution nozzle 24, wherein one reactant is a fuel and the other reactant is an oxidant. In the staged burner 10, a portion of the proportionally distributed reactant is also flowed through the staging nozzle 30. In one embodiment of the burner 10 or 11, fuel is flowed through the selective distribution nozzle 22 as the selectively distributed reactant, while oxidant is flowed through the annular proportional distribution nozzle 24 as the proportionally distributed reactant. In another embodiment of the burner 10 or 11, oxidant is the selectively distributed reactant flowed through the selective distribution nozzle 22 and fuel is the proportionally distributed reactant flowed through the annular proportional distribution nozzle 24. Further, in alternate embodiments of the burner element 20 the proportional distribution nozzle 24 need not be annular, but instead can include one or more nozzles positioned in close proximity to the selective distribution nozzle 22. For example, one proportional distribution nozzle 24 could be adjacent to the selective distribution nozzle 22, or a plurality of proportional distribution nozzles 24 could be positioned adjacent to and circumferentially around the selective distribution nozzle 22. In any configuration, the proportional distribution nozzle 24 (or nozzles 24) should be sufficient close to the selective distribution nozzle 22 that the fuel and oxidant interact and combust to form a stable flame.

In the staged burner 10, the proportion of proportionally distributed reactant introduced through the annular proportional distribution nozzles 24 as compared with the staging nozzle 30 can be adjusted in order to maintain stable burner operation and/or to control flame properties such as heat release profile. The term "staging ratio" denotes the amount of proportionally distributed reactant flow through the staging nozzle 30 divided by the total amount of the proportionally distributed reactant flow through the staging nozzle 30 and the annular proportional distribution nozzles 24 combined.

As used herein, the term "fuel" denotes any hydrocarbon-containing substance that can be used as fuel in a combustion reaction. Preferably, the fuel is a gaseous fuel, such as natural gas, but the fuel may also be an atomized liquid fuel or a pulverized solid fuel in a carrier gas. As used herein, the term "oxidant" denotes any oxygen-containing substance that can oxidize fuel in a combustion reaction. An oxidant may be air, vitiated air (i.e., gas with less than about 20.9% oxygen), oxygen-enriched air (i.e., gas with greater than about 20.9% oxygen), or essentially pure oxygen (i.e., gas with approximately 100% oxygen). In various embodiments, the oxidant is an oxygen-enriched air having an oxygen concentration of at least about 23%, at least about 26%, at least about 40%, at least about 70%, or at least about 98%.

Figure 6:
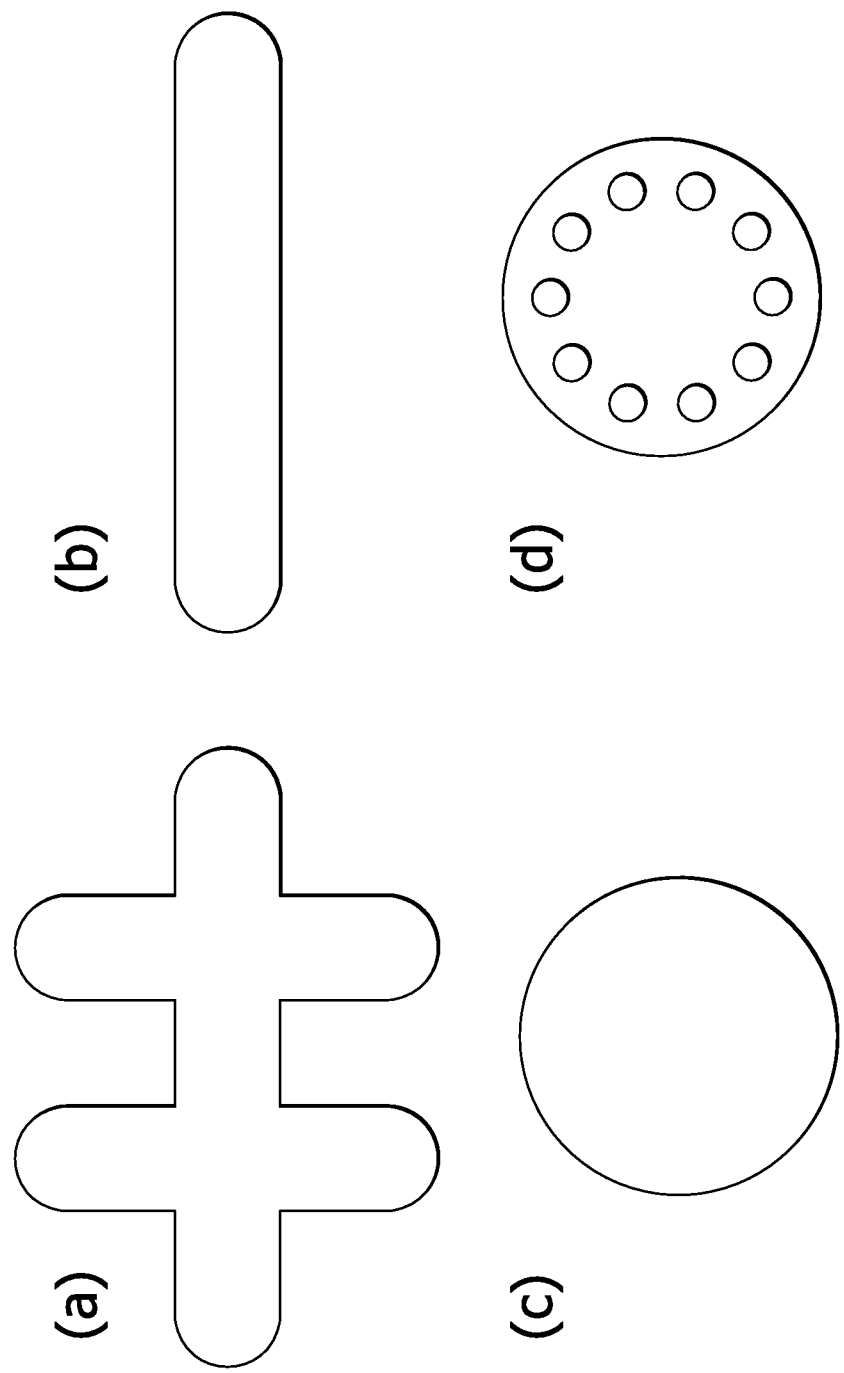
FIG. 6 shows various possible geometries of a selective distribution nozzle within each burner element.

The selective distribution nozzle 22 can be of any shape. A subset of possible exemplary shapes is shown in FIG. 6, including a slotted nozzle (FIG. 6a), a single-slot nozzle (FIG. 6b), a circular nozzle (FIG. 6c), and a multi-hole nozzle (FIG. 6d). A more detailed discussion of possible nozzle shapes can be found in U.S. Pat. No. 6,866,503, incorporated herein by reference in its entirety. For example, to create a luminous flame with high radiative transfer properties, a selective distribution nozzle 22 having a shape factor of less than 10 can be used, while to create a non-luminous flame which may have lower NOx, a selective distribution nozzle having a shape factor of 10 or greater can be used. Luminous mode might be preferred for melting operations, while non-luminous mode might be preferred for reheating operations. Note that a high shape factor nozzle can include a multi-hole nozzle. As described in detail in U.S. Pat. No. 6,866,503, the shape factor, $\sigma$, is defined the square of the perimeter, P, divided by twice the cross-sectional area, A, or in equation terms:

$$\sigma = P^2/2A.$$

Figure 2A:
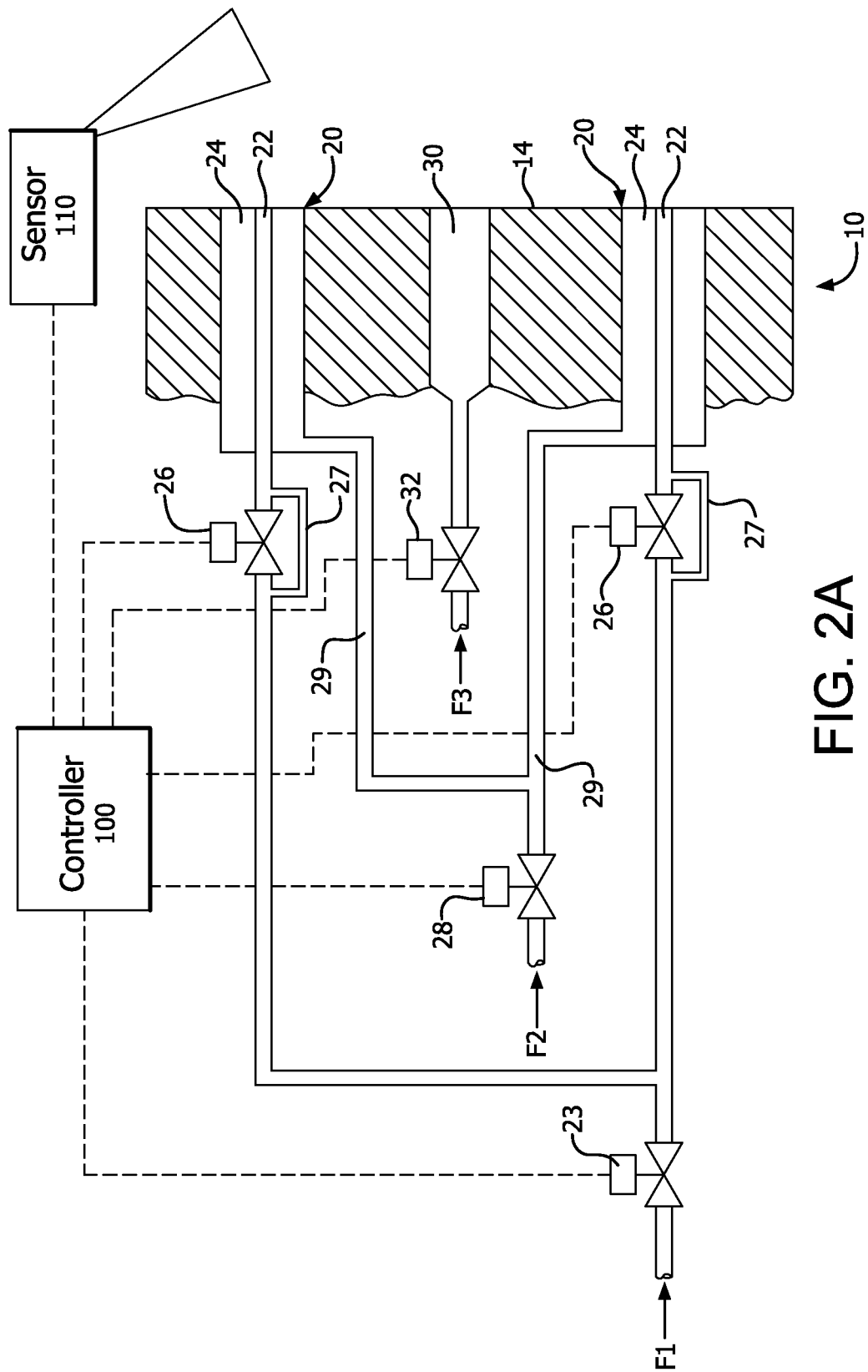
FIG. 2A is a control schematic for an embodiment of a selective boost burner with staging as in FIG. 1A.
Figure 2B:
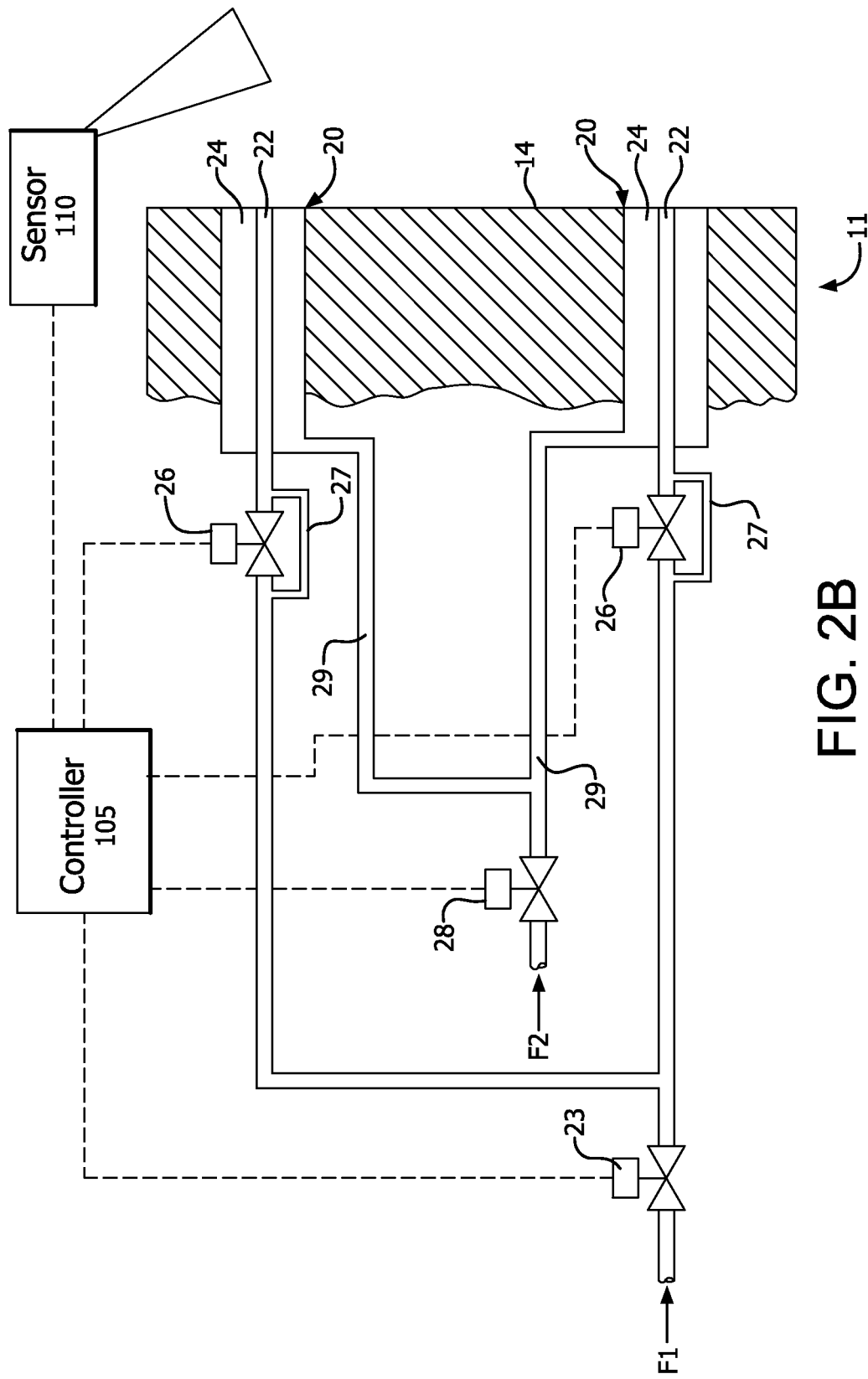
FIG. 2B is a control schematic for an embodiment of a selective boost burner without staging as in FIG. 1B.

FIG. 2A shows a simplified control schematic for a staged burner 10, and FIG. 2B shows a simplified control schematic for a non-staged burner 11, as described above. A first fluid F1 is supplied to the selective distribution nozzles 22 at a total flow rate controlled by a control valve 23. The flow of the first fluid F1 to each selective distribution nozzle 22 is separately controlled. In one embodiment, a control valve 26 upstream of each selective distribution nozzle 22 is modulated between a high flow and a low flow position, corresponding respectively to an active state and a passive state for the burner element 20 containing that selective distribution nozzle 22. In an alternate embodiment, the control valve 26 is positioned in parallel with a bypass passage 27. In this embodiment, the control valve 26 is modulated between an open position and a closed position, again corresponding respectively to active and passive states of the burner element 20, while the bypass passage 27 allows a relatively small amount of flow to bypass the control valve 26 so that some of the first fluid F1 is always flowing to the selective distribution nozzle 22, even in the passive state. The flow rates to each of the selective distribution nozzles 22 can be set so that the active state flow rates of the first fluid F1 to each selective distribution nozzle 22 can be different or the same, and the passive state flow rates of the first fluid F1 to each selective distribution nozzle 22 can be different or the same, depending on the requirements of a particular furnace or application.

The effect of either arrangement is to modulate the flow through the selective distribution nozzle 22 between an relatively higher active flow rate and a relatively lower passive flow rate. For example, an active flow rate may be defined as a flow rate greater than an average flow rate to the selective distribution nozzles 22, while a passive flow rate may be defined as a flow rate less than the average flow rate to the selective distribution nozzles 22. The average flow rate is determined by dividing the total flow rate of the first fluid F1 by the total number n of selective distribution nozzles 22/burner elements 20. Other relationships between the active flow rate and the passive flow rate may be used, with the active flow rate always being greater than the passive flow rate.

Regardless how the active and passive flow rates are determined, the passive flow rate must be greater than zero flow. The passive flow rate is sufficient to maintain combustion in each burner element 20, so as to provide a mechanism for immediate ignition when a burner element 20 is switched from the passive state to the active state. The non-zero passive flow rate also protects the selective distribution nozzle 22 from entry of foreign materials. In one embodiment, the passive flow rate is less than or equal to half of the active flow rate. In another embodiment, the ratio of the active flow rate to the passive flow rate is at least about 5 and no greater than about 40. In yet another embodiment, the ratio of the active flow rate to the passive flow rate is at least about 15 and no greater than about 25.

A second fluid F2 is supplied to the annular proportional distribution nozzles 24. A control valve 28 controls the total flow rate of the second fluid F2 to the annular proportional distribution nozzles 24, and a manifold 29 distributes the flow approximately equally across the n annular proportional distribution nozzles 24.

In the staged burner 10 (FIG. 2A) but not in the non-staged burner 11 (FIG. 2b), a third fluid F3 is supplied to the staging nozzle 30, and the flow rate of the third fluid F3 is controlled by a control valve 32. The staging nozzle 30 may include a swirl vane or other mechanism (not shown) to impart swirl to the third fluid F3 exiting the staging nozzle 30. Swirl imparted on the third fluid F3 will result in break-up of that fluid jet, which can aid in entrainment of the third fluid F3 jet by the active jet(s). However, intense swirl is not desirable since it could dominate the flow structure and alter flame shapes.

The second fluid F2 and the third fluid F3 contain the same type of reactant, either fuel or oxidant. For example, when the first fluid F1 is fuel, the second fluid F2 and the third fluid F3 are each oxidants, and when the first fluid F1 is oxidant, the second fluid F2 and the third fluid F3 are each fuels. In one embodiment, the second fluid F2 and the third fluid F3 are different fluids, i.e., each has the same reactant (fuel or oxidant) but in different concentrations. In this case, the control valve 28 and the control valve 32 must be separate valves to control the two fluids F2 and F3. In an alternate embodiment (not shown), when the second fluid F2 and the third fluid F3 are the same fluid having the same concentration of the same reactant, a staging valve can be used in place of the control valve 28 and the control valve 32 to distribute a portion of the flow approximately equally to the n proportional distribution annular nozzles 24 and the remainder of the flow to the staging nozzle 30.

In the depicted embodiments of FIGS. 2A and 2B, the flow rate of the second fluid F2 to each of the annular proportional distribution nozzles 24 is not controlled independently. As a result, each annular proportional distribution nozzle 24 always flows about an average flow rate of the second fluid F2 when the control valve 28 is open. The average flow rate is determined by dividing the total flow rate of the second fluid F2 by the total number n of annular proportional distribution nozzles 24/burner elements 20. Alternatively, the flow rate of the second fluid F2 to each annular proportional distribution nozzle 24 may be independently controlled.

In the depicted embodiments of FIGS. 2A and 2B, because the flow rate of the second fluid F2 to each annular proportional distribution nozzle 24 is about the same, each burner element 20 operates on either side of stoichiometric depending on whether that burner element 20 is active or passive at the time. When a burner element 20 is in the active state, that burner element 20 operates off of stoichiometric, and sometimes well off of stoichiometric, in one direction, and when the burner element 20 is in the passive state, that burner element 20 operates off of stoichiometric, and sometimes well off of stoichiometric, in the opposite direction. For example, when the first fluid F1 is fuel and the second fluid F2 is oxidant, a burner element 20 in the active state will operate fuel-rich and a burner element 20 in the passive state will operate fuel-lean. Alternatively, when the first fluid F1 is oxidant and the second fluid F2 is fuel, a burner element 20 in the active state will operate fuel-lean and a burner element 20 in the passive state will operate fuel-rich. However, because the total flow of fuel and oxidant is controlled by control valves 23 and 28 (and also by a staging control valve 32), the overall stoichiometry of the burner 10 remains the same regardless which, and how many, burner elements 20 are in the active state versus the passive state.

The stoichiometry at which each burner element 20 operates may be characterized by an equivalence ratio. For a given fuel flow rate, the equivalence ratio is determined as the ratio of theoretical stoichiometric oxygen flow to actual oxygen flow. For an oxidant that is 100% oxygen, the oxygen flow equals the oxidant flow. For an oxidant that an oxygen percentage X less than 100%, the oxygen flow in an oxidant stream is determined by dividing the oxidant flow rate by the oxygen percentage X; for example, to meet an oxygen requirement of 100 SCFH using an oxidant containing 40% oxygen, 250 SCFH of the oxidant is required.

The following discussion pertains to the embodiments in which the first fluid F1 is a fuel and the second fluid F2 is an oxidant (non-staged burner) and in which the first fluid F1 is a fuel and both the second fluid F2 and the third fluid F3 are oxidants (staged burner). When a burner element 20 is in the passive state, the equivalence ratio is less than about 1, and is preferably at least about 0.2. This signifies that a passive burner element 20 is operating fuel-lean, with as much as five times the oxygen required for complete combustion. In contrast, when a burner element 20 is in the active state, the equivalence ratio is greater than about 1, and is preferably no more than about 10. This signifies that an active burner element 20 is operating fuel-rich, with as little as 10% of the oxygen required for complete combustion.

A staging ratio, in the case of a staged burner, is defined as the ratio of the amount of a reactant flowing through the staging nozzle 30 to the total amount of that reactant flowing through the annular proportional distribution nozzles 24 and the staging nozzle 30. For example, when the second fluid F2 and the third fluid F3 are oxidants, the staging ratio is the amount of oxygen provided by the staging nozzle 30 divided by the total amount of oxygen provided by the staging nozzle 30 and the annular proportional distribution nozzles 24 combined. If the second fluid F2 and the third fluid F3 are the same fluids (i.e., with the same oxygen concentration), then the staging ratio is simply the third fluid F3 flow rate divided by the sum of the second fluid F2 flow rate and the third fluid F3 flow rate. But if the second fluid F2 and the third fluid F3 are different fluids (i.e., with different oxygen concentrations $X_2$ and $X_3$, respectively), then the staging ratio is calculated to take into account the concentration differences, as $X_3F_3/(X_2F_2+X_3F_3)$, as would be understood by a person of skill in the art.

The staged burner 10 is preferably operated with a staging ratio of equal to or less than about 75%. For example, when oxidant is staged, i.e., when the second fluid F2 and the third fluid F3 are oxidants, at least about 25% of the oxygen to the burner 10 is flowed through the annular proportional distribution nozzles 24 and no more than about 75% of the oxygen is flowed through the staging nozzle 30. More preferably, the staged burner 10 is operated with a staging ratio of equal or less than about 40%. Further, as discussed above, because of the active or passive operation of each of the burner elements 20, the one or more burner elements 20 active at one time operate with an excess of the first fluid F1 compared to stoichiometric, and the one or more burner elements 20 that are passive at the same time operate with an excess of the second fluid F2 compared to stoichiometric, thereby providing some amount of staging even without taking into account the third fluid F3 provided by the staging nozzle 30.

Further, even the non-staged burner 11 operates with some amount of "staging" in that the active burner elements 20 operate rich in the first fluid F1 and the passive burner elements operate lean in the first fluid F1, such that some of the first fluid F1 from the active burner elements 20 combusts in a more delayed and diffuse manner with some of the second fluid F2 from the passive burner elements 20. For example, when the first fluid F1 is fuel and the second fluid F2 is oxidant, the active burner elements 20 are fuel rich and some of the excess fuel combusts with the excess oxidant from the passive burner elements 20, which are fuel lean.

The first fluid F1 exiting an active selective distribution nozzle 22 has an active jet velocity determined by the first fluid F1 flow rate and the cross-sectional area of the selective distribution nozzle 22. The second fluid F2 exiting an annular proportional distribution nozzle 24 has an annular jet velocity determined by the second fluid F2 flow rate and the cross-sectional area of the annular proportional distribution nozzle 24. In the staged burner 10, the third fluid F3 exiting the staging nozzle 30 has a staging jet velocity determined by the third fluid F3 flow rate and the cross-sectional area of the staging nozzle 30. The active jet velocity preferably is greater than the annular jet velocity for both the staged burner 10 and the non-staged burner 11.

In addition, for optimal performance of the staged burner 10, the staging jet velocity should be less than or equal to the active jet velocity, and greater than or equal to about 0.05 times the active jet velocity. In one embodiment, the ratio of the staging jet velocity to the active jet velocity is less than or equal to about 0.4. In another embodiment, the ratio of the staging jet velocity to the active jet velocity is greater than or equal to about 0.1.

In one exemplary embodiment tested in a vertical firing arrangement (roof mounted), the first fluid F1 jet velocity through an active selective distribution nozzle 22 was at least about 250 ft/s and was preferably at least about 300 ft/s, and the velocity through a passive selective distribution nozzle 22 was about 20% of the active jet velocity. For a horizontal firing arrangement, the active jet velocity can be considerably lower since there is less need to combat buoyancy effects to avoid burner block overheating.

All of the control valves 23, 26, 28, and 32 are connected to and controlled by a controller 105 that is specifically programmed or configured to operate the burner 10. The controller 105 may include conventional electronics components such as a CPU, RAM, ROM, I/O devices, and the programming or configuration of the controller 105 may be accomplished by a combination of one or more of hardware, firmware, software, and any other mechanism now known or later developed for programming operating instructions into a controller.

As described above, one of the fluids F1 and F2 must be or contain a fuel, and the other of the fluids F1 and F2 must be an oxidant or contain oxygen. In a staged burner 10, the third fluid F3 should be the same type of fluid (fuel or oxidant) as the second fluid F2. The fuel can be a gaseous fuel, a liquid fuel, or a pulverized solid fuel in a gaseous carrier. In one embodiment of a non-staged burner 11, F1 is a fuel and F2 is an oxidant. In one embodiment of s staged burner 10, F1 is a fuel and F2 and F3 are oxidants. In this case, F2 and F3 may be the same oxidant, or F2 and F3 may be different oxidants. For example, in one preferred embodiment, F1 is a gaseous fuel such as natural gas, F2 is an oxidant having an oxygen concentration of equal to or greater than about 70%, for a staged burner 10 or a non-staged burner 11. For a staged burner 10 in this embodiment, F3 is an oxidant having an oxygen concentration of equal to or greater than about 20.9%. In another similar embodiment, F1 is a gaseous fuel such as natural gas, F2 is an oxidant having an oxygen concentration greater than that of air, and in the staged burner version, F3 is air.

In an alternate embodiment, F1 is an oxidant and F2 (and F3 in the case of staging) are fuels. In this case F1 has an oxygen concentration equal to or greater than about 26%, preferably equal to or greater than about 40%, and more preferably equal to or greater than about 70%.

Figure 3:
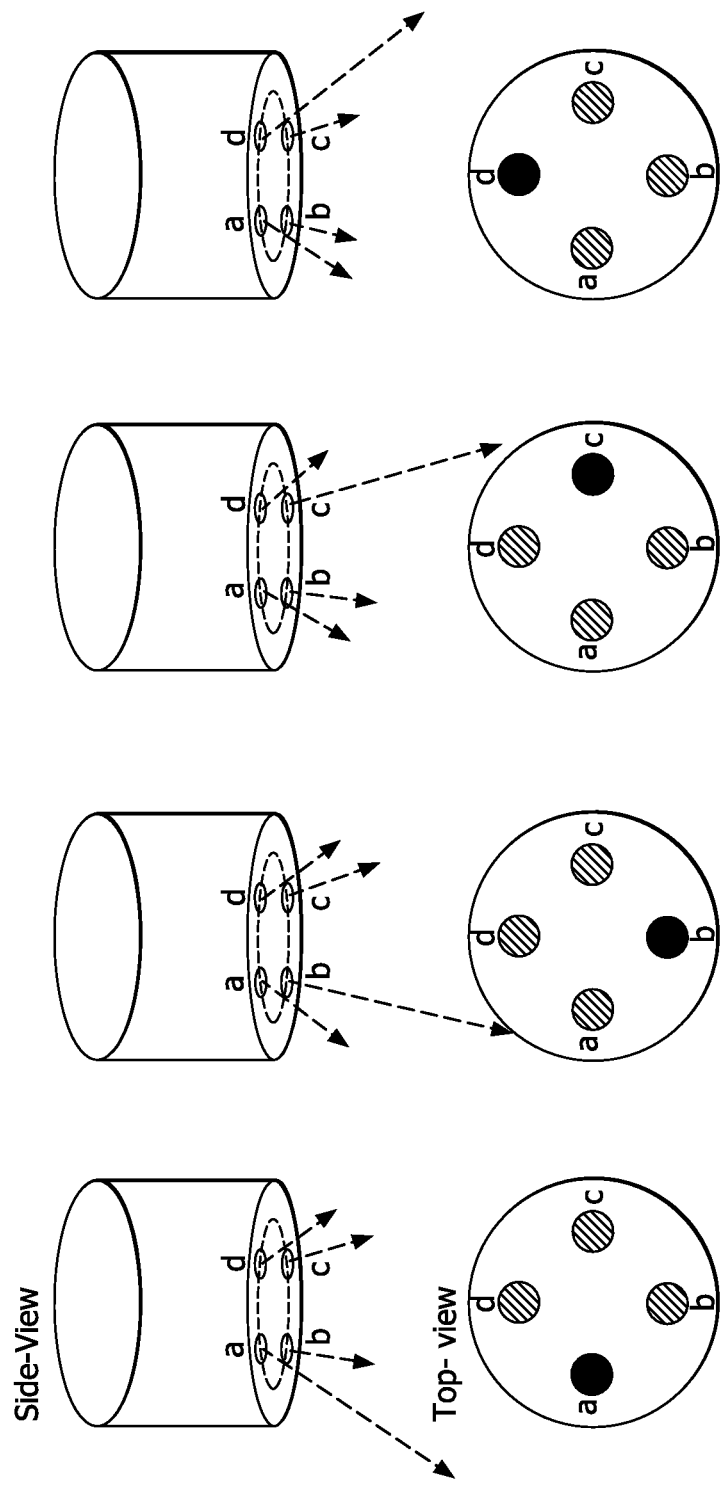
FIG. 3 is an operational sequence schematic for an embodiment of a selective boost burner as in FIGS. 1A and 1B.

FIG. 3 shows one possible sequence of operation for the embodiment of the burners 10 and 11 illustrated in FIGS. 1A and 1B. For purposes of discussion, the four burner elements 20 are labeled as a, b, c, and d. As shown, only one burner element 20 is active at a time, while the remaining burner elements 20 are passive, and each burner element 20 is successively switched to the active state when the previously active burner element 20 is returned to the passive state.

In particular, in the depicted embodiment, burner element 20a is active while burner elements 20b, 20c, and 20d are passive. In other words, each of the annular nozzles 24 in each burner element 20 is receiving an approximately equal flow of the second fluid F2, and only the selective distribution nozzle 22 in burner element 20a is receiving a higher active flow of the first fluid F1, while the selective distribution nozzles 22 in the other burner elements 20b, 20c, and 20d are receiving a lower passive flow of the first fluid F1. This results in a relatively long, penetrating flame emanating from the active burner element 20a and relatively short (pilot) flames emanating from the passive burner elements 20b, 20c, and 20d. As further shown in the depicted embodiment, when burner element 20b becomes active, burner element 20a returns to the passive state and burner elements 20c and 20d remain passive. Next, when burner element 20c becomes active, burner element 20b returns to the passive state and burner elements 20c and 20a remain passive. Finally, when burner element 20d becomes active, burner element 20d returns to the passive state and burner elements 20a and 20b remain passive.

The sequence shown in FIG. 3 and described above is only one of essentially limitless variations. In one non-limiting example, one burner element 20 is active at a time in a repeating sequence such as a-b-c-d or a-b-d-c or a-c-b-d or a-c-d-b. In another non-limiting example, one burner element 20 is active at a time in a random sequence. In yet another non-limiting example, one burner element 20 is active at a time but each for either the same or different lengths of time.

Further, in other examples, more than one burner element 20 is active at a time. For example, for a burner 10 having three or more burner elements 20, two burner elements 20 may be active and the remainder passive. In general, for a burner 10 having n burner elements, any number of burner elements from 1 to n−1 may be active, and the remainder passive.

Each burner element 20 can be switched from the passive to the active state based on a preprogrammed time sequence, according to a predetermined algorithm, according to a random sequence, depending on furnace conditions, or synchronized with other cyclical or periodic events in the furnace. One or more sensors 110 may be positioned in the furnace for sensing any parameter that may be relevant to determining locations where more or less combustion heat is needed. For example, the sensor may be a temperature sensor, such that when the temperature sensor is below a threshold setting, the burner element 20 oriented to heat the furnace in the region of that temperatures sensor may be made active more frequently or for longer periods of time. Or if a temperature sensor detects that a portion of the furnace or charge is receiving insufficient heat, one or more burner elements 20 positioned near that portion of the furnace or angled toward that portion of the charge can be switched to the active state, while burner elements 20 in portions of the furnace receiving excess heat can be switched to the passive state. With specific regard to a regenerative furnace, temperature sensors, such as optical sensors, can detect the temperature of the charge in various parts of the furnace and to detect regions in need of additional heat, such as all or portions of the cold spot 122, and burner elements 20 targeted to those regions can be made active for longer periods of time or more frequently to increase the temperature of those regions.

Temperatures sensors may include contact sensors such as thermocouples or RTDs located in the furnace walls, or non-contact sensors such as infrared sensors, radiation sensors, optical sensors, cameras, color sensors, or other sensors available to those in the industry. Other types of sensors may also be used to indicate the level of melting or heating in the furnace, including but not limited to proximity sensors (e.g., to sense the proximity of solid charge that has yet to melt) or conductivity sensors (e.g., to detect the higher conductivity of a liquid as compared to chunks of poorly interconnected solids).

Several benefits can be achieved by operation of the burner 10 or the burner 11 as described herein. Because heat can be preferentially directed to certain locations and for longer or shorter periods of time, cold spots in the furnace can be identified and eliminated, resulting in more uniform heating and melting. Particularly for vertical firing arrangements (i.e., roof-mounted burners pointing downward) as in FIG. 7 or FIG. 15, operating the burner with less than all of the burner elements 20 in active mode reduces or eliminates the hazards of buoyant flames, thereby avoiding overheating of the burner block and furnace roof. The fuel-rich combustion resulting from an active burner element 20, where the oxygen provided through the annular proportional distribution nozzle 24 is significantly less than the stoichiometric oxygen required by the fuel provided through the selective distribution nozzle 22, creates a non-oxidizing atmosphere near the melt bath to help protect the charge from undesirable oxidation. Additionally, activating the burner elements 20 in a repeated cyclical pattern can b used to generate a vortex heating pattern that increases residence time of combustion gases, increases heat transfer rates, and improves uniformity of heating, as shown for example in US 2013/00954437. Further, selective activation of burner elements 20 and variation of the staging ratio can be used to adjust the location of maximum heat flux emanating from the combustion reactions and to adjust flame coverage to accommodate various furnace geometries, conditions, and charge levels.

Figure 5B:
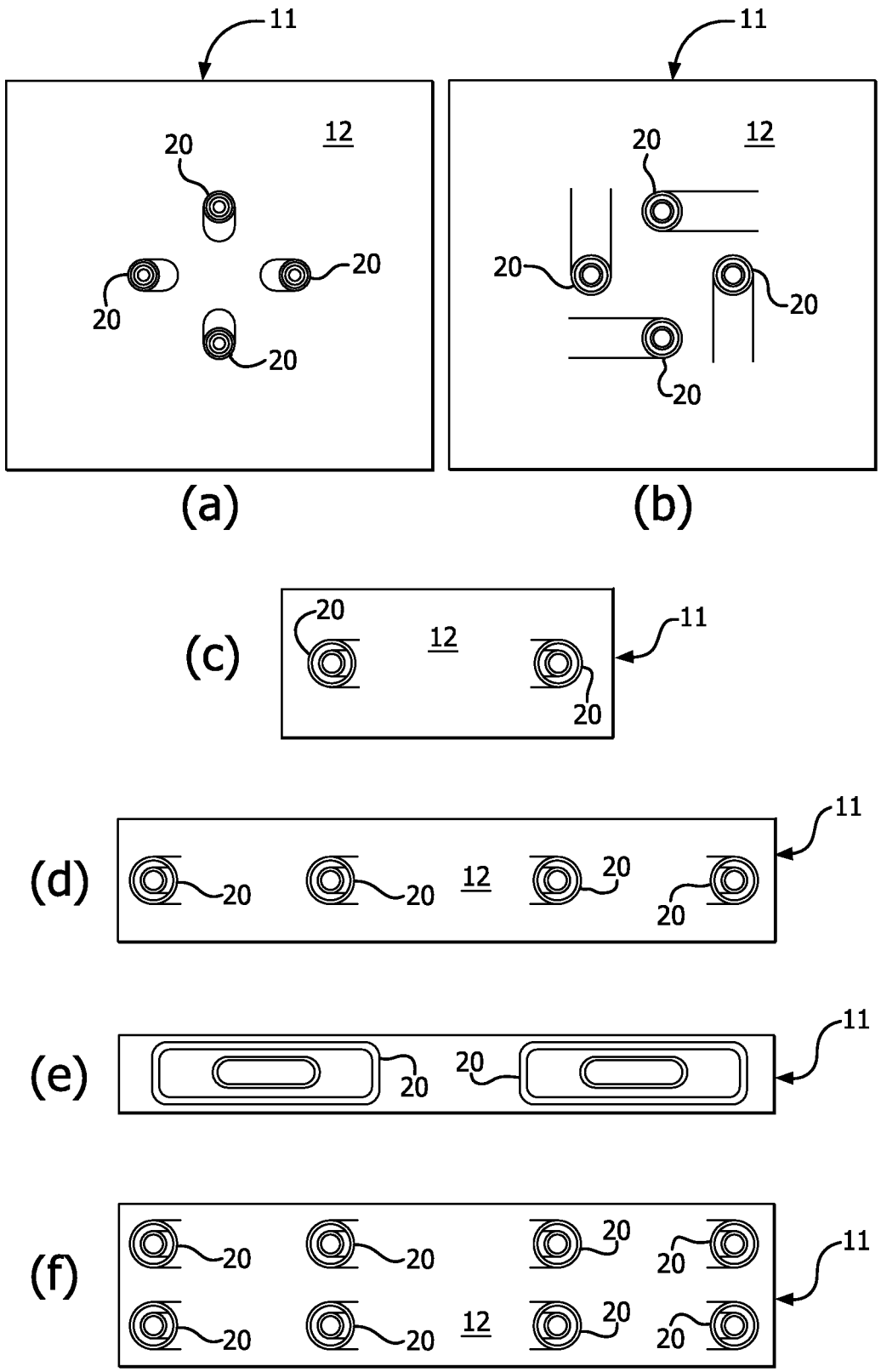
FIGS. 5B(a)-5B(f) are end views of various embodiments of a selective boost burner without staging.

Various possible configurations of the staged burner 10 and non-staged burner 11 include those shown in FIGS. 5A and 5B. In an embodiment of the type shown in FIG. 5A(a) and 5B(a), one or more of the burner elements 20 may be angled radially outward at an angle $\alpha$ from the circle circumscribed by the burner elements 20, or from an axis perpendicular to the burner block 12 or an axis defined by the staging nozzle 30. Although the depicted embodiment shows all four burner elements 20 angled radially outward at the same angle $\alpha$, it is understood that each burner element 20 may be angled at a different angle $\alpha_n$, depending on the furnace geometry and desired operating characteristics of the burner 10. The angle $\alpha$ may be equal to or greater than about 0° and is preferably non-zero and equal to or less than about 60°. More preferably, the angle $\alpha0$ is at least about 10° and no greater than about 40°.

In an embodiment of the type shown in FIGS. 5A(b) and 5B(b), one or more burner elements 20 may be angled tangentially to the circumscribed circle at an angle $\beta$ to create swirl. Although the depicted embodiment shows all four burner elements 20 angled tangentially at the same angle $\beta$, it is understood that each burner element 20 may be angled at a different angle $\beta_n$, depending on the furnace geometry and desired operating characteristics of the burner 10. The angle $\beta$ may be equal to or greater than about 0° and is preferably equal to or less than about 60°. More preferably, the angle $\beta$ is at least about 10° and no greater than about 40°.

In an embodiment of the type shown in FIGS. 5A(c) and 5B(d), a plurality of burner elements 20 are positioned generally collinearly with each other to define a line having a midpoint and ends. Although four burner elements 20 are shown, this embodiment is applicable to a configuration with at least two burner elements 20 (for example as shown in FIG. 5B(c) for a non-staged burner) and up to as many burner elements 20 as may be required in a particular furnace. In a staged burner, a staging nozzle 30 is positioned between each adjacent pair of burner elements 20, so that the burner elements 20 and staging nozzles 30 alternate. For example, an arrangement with two burner elements 20 has one staging nozzle 30 positioned between the two burner elements 20, and an arrangement with three burner elements 20 has two staging nozzles 30 each positioned between a pair of adjacent burner elements 20. The burner elements 20 may all be oriented perpendicularly to the burner face 14, or some or all of the burner elements 20 may be angled outward at an angle $\gamma$ of less than or equal to about 45° from the line midpoint toward one of the line ends. Similarly, the staging nozzles 30 may be oriented perpendicularly to the burner face 14, or some or all of the staging nozzles 30 may be angled in one direction or the other along the line. In the depicted embodiment, a central staging nozzle 30 is oriented perpendicularly to the burner face 14, and a series of three collinear elements—a burner element 20, a staging nozzle 30, and another burner element 20—are positioned diametrically to either side and angled away from the central staging nozzle 30 and toward their respective ends of the line.

In an embodiment of the type shown in FIGS. 5A(d) and 5B(d), a plurality of burner elements 20 are positioned collinearly with each other to define a line having a midpoint and ends. Although four burner elements 20 are shown, this configuration is application to a configuration with at least two burner elements 20 and up to as many burner elements 20 as may be required in a particular furnace. In a staged burner, an elongated or generally rectangular staging nozzle 30 having a major axis at least 1.5 times as long as a minor axis is positioned adjacent to and spaced apart by a fixed distance from the burner elements 20, with the major axis substantially parallel to the line defined by the burner elements 20. The burner elements 20 may all be oriented perpendicularly to the burner face 14, or some or all of the burner elements 20 may be angled outward at an angle γ of less than or equal to about 45° from the line midpoint toward one of the line ends.

In an embodiment of the type shown in FIGS. 5A(e) and 5B(e), each burner element 20 has a flat-flame configuration, wherein both the selective distribution nozzle 22 and the annular nozzle 24 have an elongated or generally rectangular configuration having a major axis at least 1.5 times as long as a minor axis. This type of flat flame burner is described in detail, for example in U.S. Pat. No. 5,611,682. In staged burner, at least two staging nozzles 30 are positioned adjacent to and spaced apart from the burner element 20, and are oriented generally collinearly to define a line that is substantially parallel to the major axis of the burner element 20. At least two burner elements 20 are utilized in this configuration.

In any of the above-described configurations in FIGS. 5A and 5B, a selective operation scheme can be implemented similar to that describe above for the configuration of FIGS. 1A and 1B. Specifically, at any given time, at least one burner element 20 is operated in an active state, wherein the fluid flow through an active selective distribution nozzle 22 is greater than the average fluid flow through all of the selective distribution nozzles 22, while at least one burner 20 is operated in the passive stage, wherein the fluid flow through a passive selective distribution nozzle 22 is less than the average fluid flow through all of the selective distribution nozzles 22.

Figure 7:
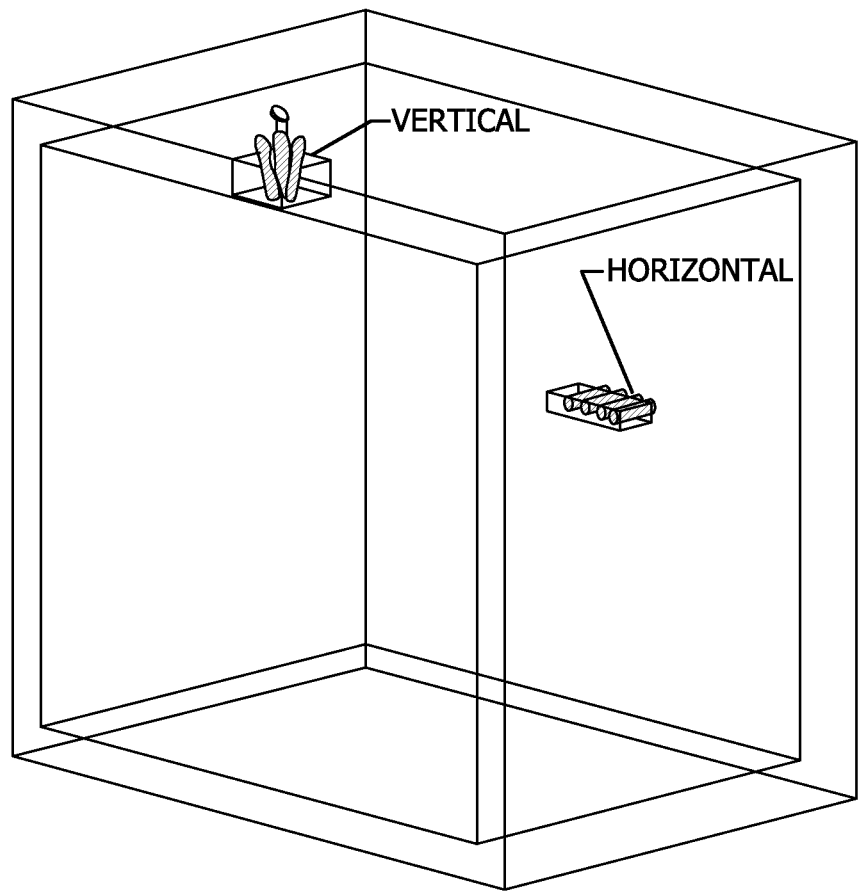
FIG. 7 is a perspective view of a one type of furnace showing two possible mounting orientations of a selective boost burner.
Figure 15:
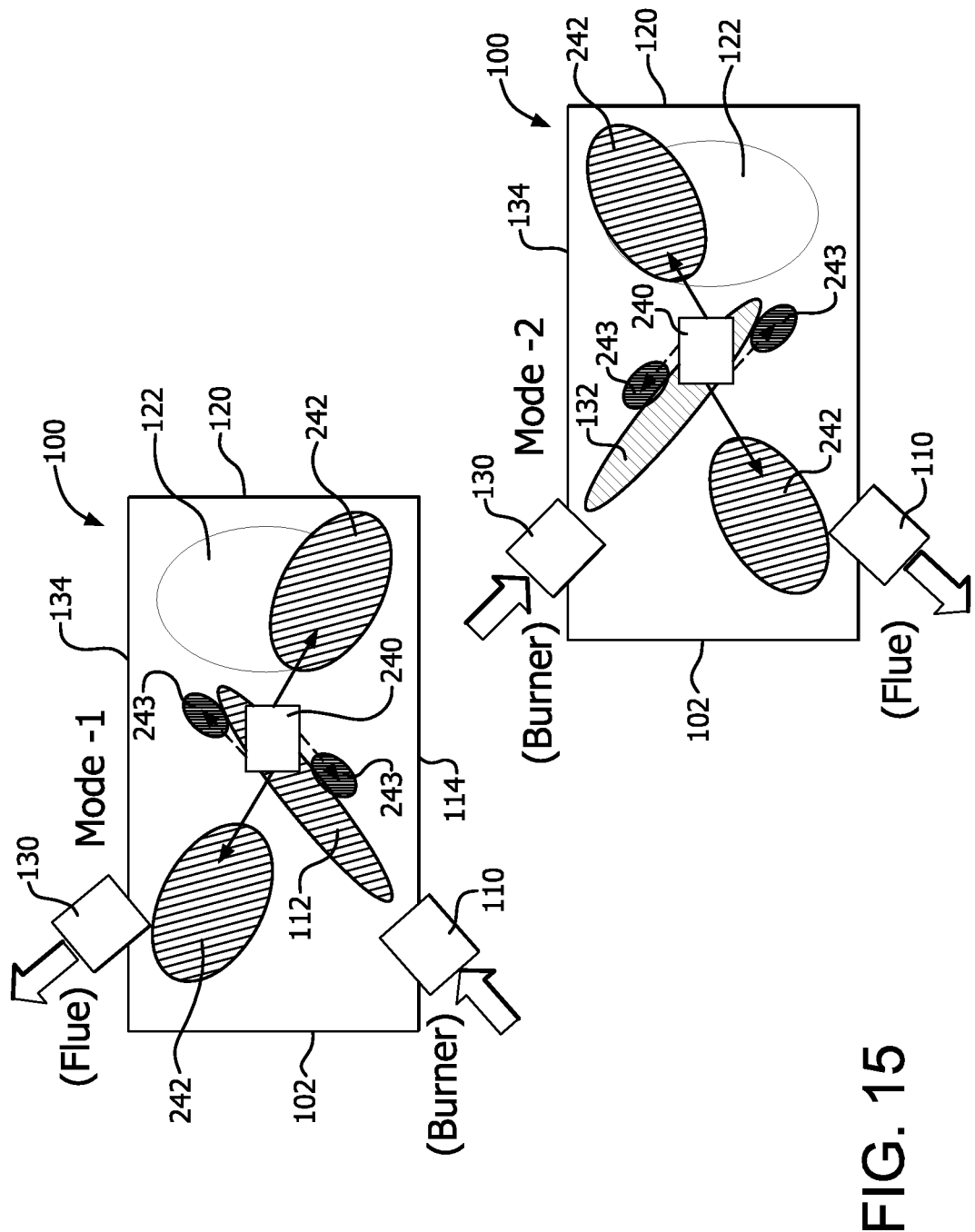
FIG. 15 is a schematic plan view of an angled side-port regenerative furnace showing a configuration of a roof mounted selective boost burner.

As shown in FIG. 7 and FIG. 15, one or more burners 10 or 11 may be mounted in the roof of a furnace 200 (vertically installation) or in a sidewall of a furnace 200 (horizontal installation). In a vertical installation, the burner elements 20 are preferably arranged in a configuration such as in FIG. 5A(a) or FIG. 5B(a) or FIG. 5A(b) or FIG. 5B(b), to provide optimal heat flux to the charge while preventing overheating of the burner block. For example, as discussed above, the burner elements 20 can be oriented to angle radially outward from the circumscribed circle defined by the burner elements 20, and that encloses the staging nozzle 30 in the staged burner 10 (FIG. 5A(a)). Alternatively, the burner elements 20 can be oriented in a vortex configuration (angled tangentially to the circumscribed circle) (FIG. 5A(b) or FIG. 5B(b)). In a horizontal configuration, the burner elements 20 can be arranged in any array, and in particular may be arranged as in any of FIGS. 5A(c)-5A(e) or FIGS. 5B(c)-5B(e) depending on the geometry of the furnace. In addition, multiple rows of collinear elements may be used, particular in a non-staged burner 11, as shown in FIG. 5B(f).

Figure 8:
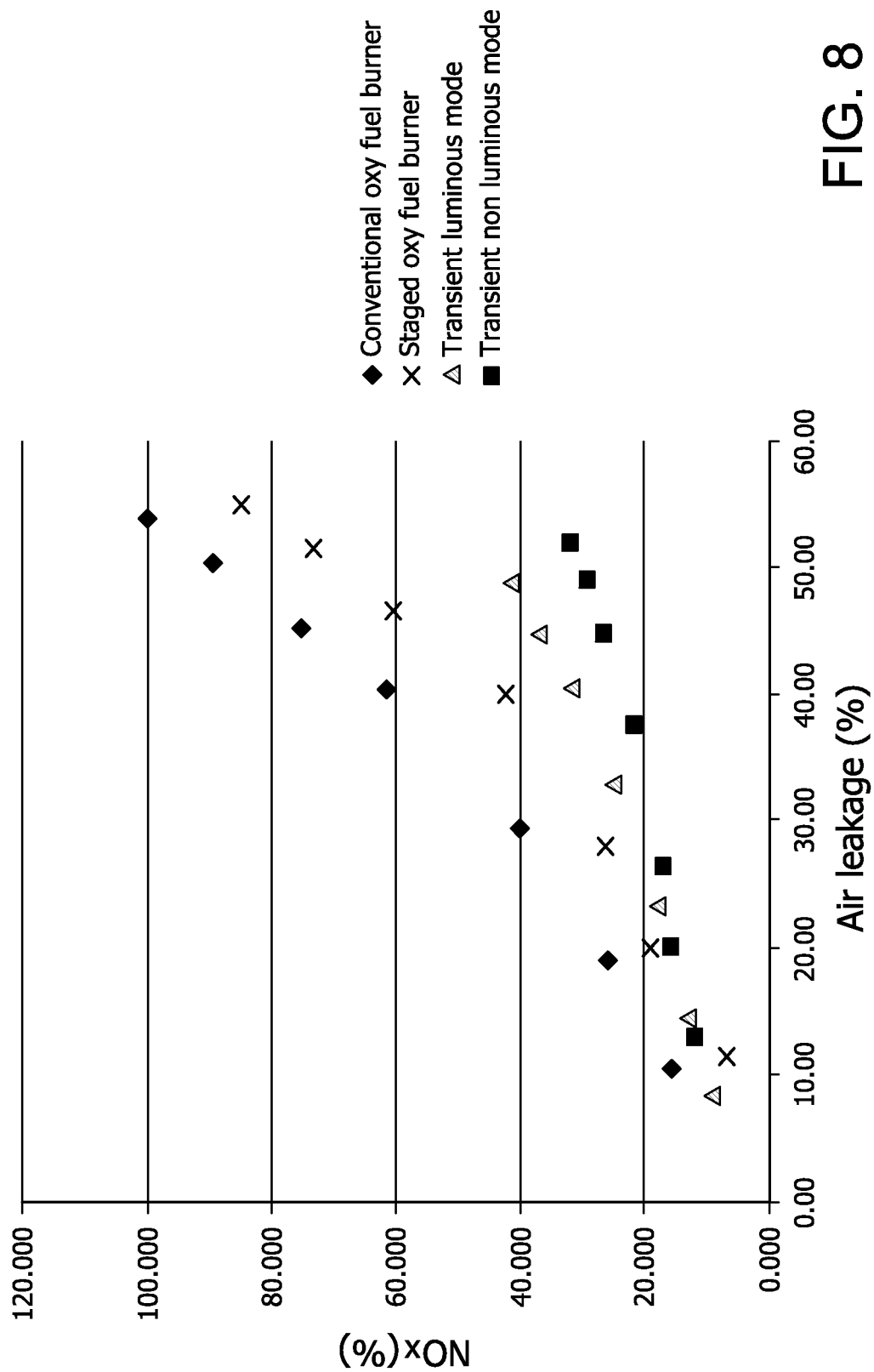
FIG. 8 is a graph comparing on a relative scale NOx production data from a conventional oxy-fuel burner, a conventional staged oxy-fuel burner, and a selective boost burner, in a furnace such as in FIG. 7, operated in both luminous and non-luminous modes.
Figure 9:
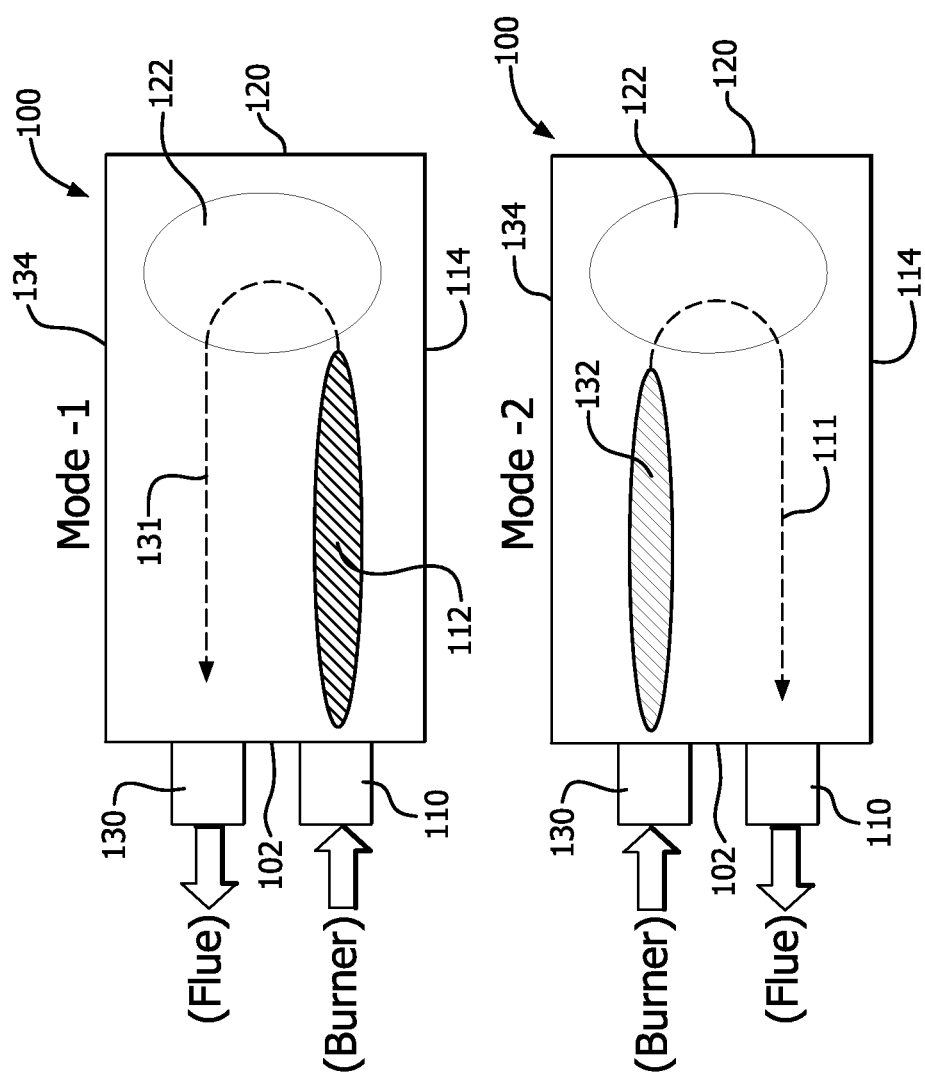
FIG. 9 is a schematic plan view of an exemplary air-fuel fired end-port regenerative furnace.

As shown in the data of FIG. 8, the staged burner 10 exhibits reduced NOx emissions compared with conventional oxy-fuel burners. Note that the scale of FIG. 8 is relative, normalized to the peak NOx of a conventional oxy-fuel burner. When the burner 10 is operated selectively as described herein in a luminous mode (i.e., with a low shape factor selective distribution nozzle 22), the peak NOx emissions are only about 40% of that emitted by a conventional oxy-fuel burner. When the staged burner 10 is operated selectively as described herein in a non-luminous mode (i.e., with a high shape factor selective distribution nozzle 22), the peak NOx emissions are even lower, only about 35% of that emitted by a conventional oxy-fuel burner. In both cases, the staged burner 10 was operated with fuel as the distributed fluid and oxidant as the staged fluid.

Without being bound by theory, this surprising result is thought to be a result of the highly staged nature of the combustion produced by the burner 10, which results in a first fuel-rich flame zone that produces low NOx due to limited oxygen availability, and a second fuel-lean flame zone that produces low NOx due to its low combustion temperatures.

The selective boost staged burner 10 or non-staged burner 11 may include a combination of two or more burner elements 20 either co-located (in one or more housings) or positioned at different locations (in two or more separate housings) in the furnace 100 and operated in a selective boost manner as described herein, and be used to effectively provide boost heating to a regenerative furnace while maintaining relatively low NOX emissions in the flue gas.

In general, delaying mixing between air, oxygen, and fuel can reduce the localized (peak) flame temperatures and thus reduce the potential for NOx generation. One way to accomplish a delay of is the spatial separation of air, oxygen, and fuel, at least when introduced into the furnace. In other words, installing oxy-fuel burners separated from air-fuel burners tends to have a lower NOx potential than general oxygen enrichment (i.e., using oxygen-enriched air in a single air-oxy-fuel burner), because general oxygen enrichment tends to have more intimate mixing of oxygen and air.

However, the degree of achievable separation maybe constrained by the relative physical arrangement of burners in the furnace, availability of space, energy (boosting) needs, and other factors. For instance, if two oxy-fuel boost burners 140, 150 are installed to eliminate the cold spot 122, as shown in the comparative example of FIG. 10, and those boost burners 140, 150 are located on either transverse side of the furnace due to space limitations, then each of the oxy-fuel flames will tend to interact with a corresponding one of the flames from the regenerator port burners 110, 130 during each mode of operation. More specifically, the oxy-fuel flame 142 of the boost burner 140 will interact with the air-fuel flame 112 of the first regenerator port burner 110 during the first mode of operation, while the oxy-fuel flame 152 of the boost burner 150 will interact with the air-fuel flame 132 of the second regenerator port burner 130 during the second mode of operation. This not only increases the potential for NOx generation, creates a collision of flames that can result in stagnation of flue gas flows and chimney generation that may overheat the roof.

More generally, each regenerator port 110, 130 in the end wall 102 defines a flame zone 112, 132 respectively, such that when that regenerator port is operating as a burner, the fuel and air combine and the most intense combustion occurs in the flame zone. For an end-port regenerator port burner 110, this flame zone is typically positioned along a longitudinal region on one side 114 of the furnace 100 (i.e., the first half of the U-shaped flow pattern, before the bend in the U), such that combustion is mostly complete by the time the combustion products make the U-bend at the far end 120 of the furnace 100, and the return flow 131 of the U-shaped flow pattern along a parallel longitudinal region on the opposite side 134 of the furnace 100 is primarily combustion products on their way to be exhausted from the other end-port regenerator port 130. When the regenerator ports 110, 130 switch, this flow pattern reverses but is otherwise identical, such that the flame zone 132 is along a longitudinal region on one side 134 of the furnace 100, the combustion is mostly complete by the time the combustion products make the U-bend at the far end 120, and the return flow 111 occurs along a parallel longitudinal region on the opposite side 114 of the furnace 100 on the way to exhausting the combustion products from the other end-port regenerator 110. Thus, a relative cold spot 122 persists at the far end of the 120 of the furnace 100. While using continuously firing boost burners 140, 150 will provide additional heat to the cold spot 122, the boost burners 140, 150 each define their own flame zone. When the flame zone of one of the boost burners 140, 150 overlaps with or interacts with the flame zone from either of the regenerator port burners 110, 130, problems such as increased NOx and localized overheating may occur, as discussed above.

Figure 10:
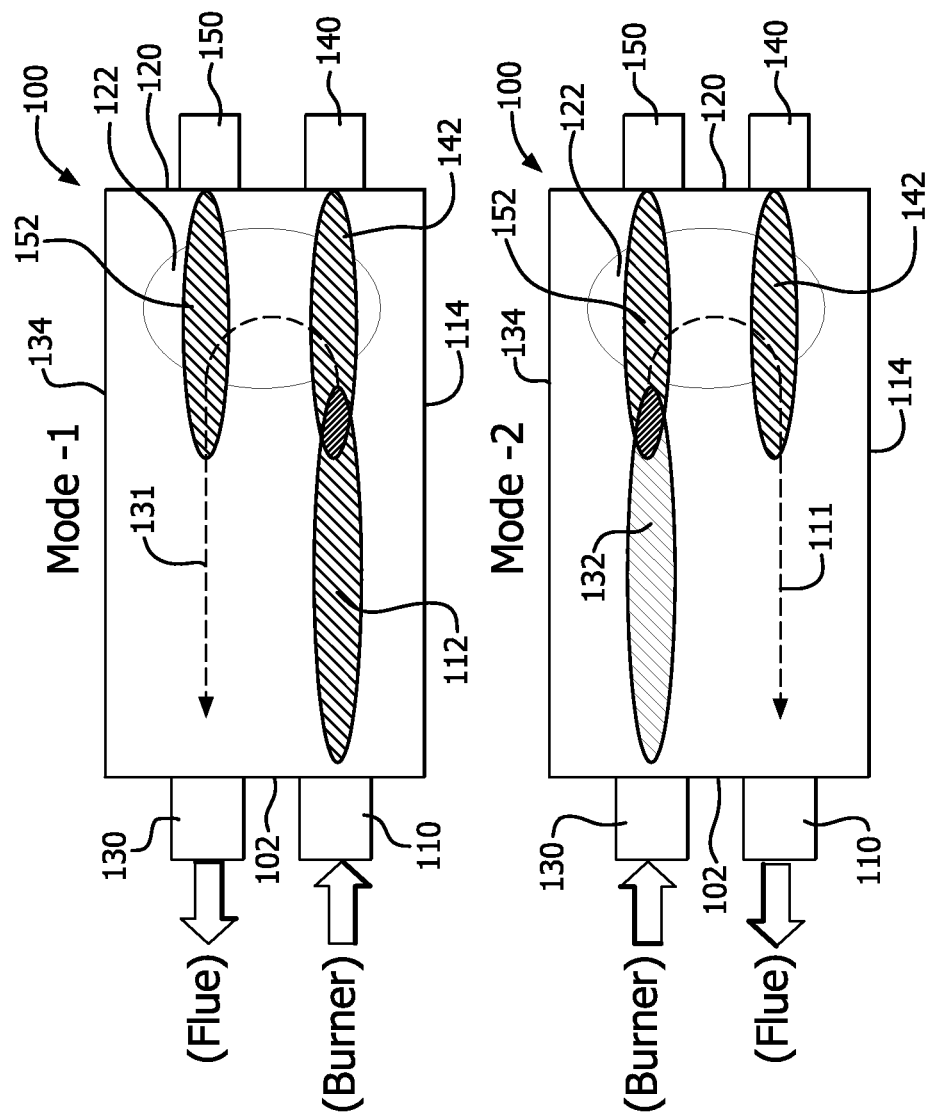
FIG. 10 is a schematic plan view of an end-port regenerative furnace showing a comparative configuration of continuously fired oxy-fuel boost burners.

Several configurations described herein can alleviate the problems associated with the comparative example of FIG. 10 while efficiently providing heat to reduce or eliminate the cold spot 122 in the furnace 100.

Figure 11:
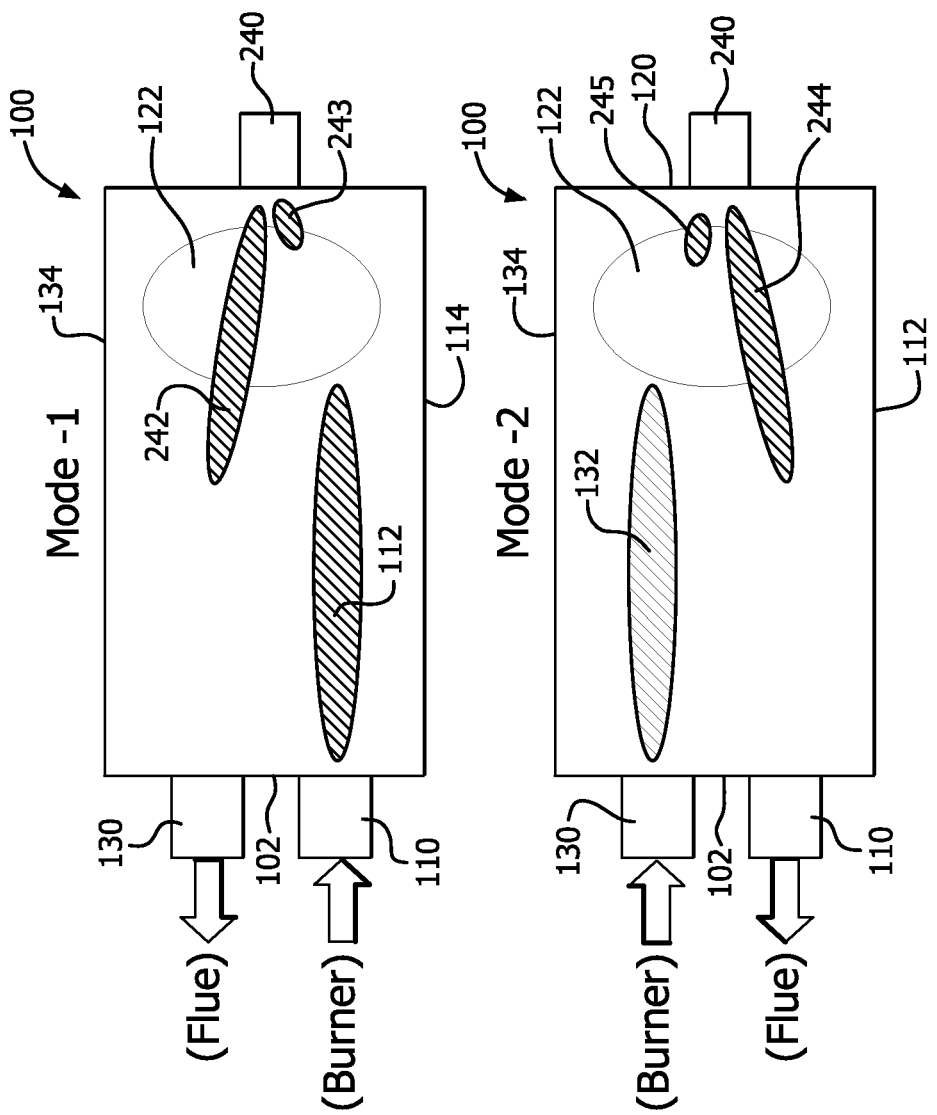
FIG. 11 is a schematic plan view of an end-port regenerative furnace showing operation of an end wall mounted selective boost burner having multiple burner elements contained in a single housing.

In the configuration of FIG. 11, a selective oxy-fuel boost burner 240 is mounted in the end wall 120 of the furnace opposite the end wall 102 in which the regenerator ports 110, 130 are located. The boost burner 240 may be configured in any of the configurations described above for boost burners 10 and 11, and in particular the boost burner 240 is preferably configured with at least two burner elements 20 angled outward as shown for example in FIG. 5B(c) or 5B(d), or with at least two burner elements 20 spaced laterally apart and directed substantially perpendicularly with respect to the end wall 120. In either orientation, whether angled outward or perpendicular, the burner elements may be of any shape. In addition, in either orientation, the burner elements may also be angled downward toward the charge or upward away from the charge, if desired. Multiple rows of co-linear burner elements 20 may also be used as in FIG. 5B(f).

The boost burner 240 of FIG. 11 has multiple flame zones, with one flame zone associated with each burner element 20. For example, in a boost burner 240 with two flame elements 20, one burner element 20 is oriented to have a flame zone 242 that fires into a complimentary region of the furnace 100 with respect to the regenerator port burner 110, and thus does not substantially interact with the flame zone 112 of the regenerator port burner 110. And the other burner element 20 is oriented to have a flame zone 244 that fires into a complimentary region of the furnace 100 with respect to the regenerator port burner 130 and thus does not substantially interact with the flame zone 132 of the regenerator port burner 130.

The controller 105 is configured and programmed to synchronize the selective active/passive firing of the respective burner elements 20 in the boost burner 240 with the alternate firing/exhausting of the regenerator ports 110, 130. At any given time, the controller 105 first identifies which regenerator port 110, 130 is currently firing and which is currently exhausting. Then, the controller 105 sets or maintains in an active mode the one or more burner elements 20 whose flame zones fire into complimentary regions of the furnace with respect to the flame zone of the regenerator port currently firing, and sets or maintains in a passive mode the one or more burner elements 20 whose flame zones would overlap or interact with the flame zone of the regenerator port current firing.

More specifically, as discussed above, the flow rate of the proportionally distributed reactant, the second fluid F2, remains constant in the annular proportional distribution nozzle 24 of each burner element 20 while the flow rate of the selectively distributed reactant, the first fluid F1, is modulated to a higher active flow rate through the selective distribution nozzle 22 of the at least one burner element 20 designated as active and is modulated to a lower passive flow rate through the selective distribution nozzle 22 of the at least one burner element 20 designated as passive. The controller conducts this routine iteratively, so that when the currently firing regenerator port switches, the burner elements 20 quickly switch in response, with the previously passive burner elements 20 typically becoming active and the previously active burner elements 20 typically becoming passive. Note, however, that in some furnace configurations one or more burner elements 20 may remain active continuously and/or one or more burner elements 20 may remain passive continuously, regardless which regenerator port is currently firing. For example, in some configurations, a particular burner element 20 may have a flame zone that does not overlap with the flame zone of either regenerator port, while another particular burner element 20 may have a flame zone that would overlap with the flame zones of both regenerator ports.

In one embodiment of a configuration as in FIG. 11, the first fluid F1 is fuel and the second fluid F2 is oxidant. Preferably the oxidant is at least 26% molecular oxygen, at least 40% molecular oxygen, at least 70% molecular oxygen, at least 98% molecular oxygen, or is commercial pure oxygen. Therefore, each of the burner elements 20 of the selective boost burner 240 that are in active mode operate fuel-rich (i.e., an equivalence ratio greater than 1 and up to about 10) while each of the burner elements 20 that are in passive mode operate fuel-lean (i.e., an equivalence ratio less than 1 and down to about 0.2). Consequently, the combustion products leaving the flame zone of the firing regenerator port will first interact with a low momentum, fuel lean flame zone from the one or more passive burner elements 20 going into the U-bend, and then with a high momentum, fuel rich flame zone from the one or more active burner elements 20 after passing through the U-bend. This lean then rich combustion sequence avoids the peak NOx production stoichiometry while still delivering significant combustion heat to the cold spot 122 at the far end 120 of the furnace 100.

Figure 12:
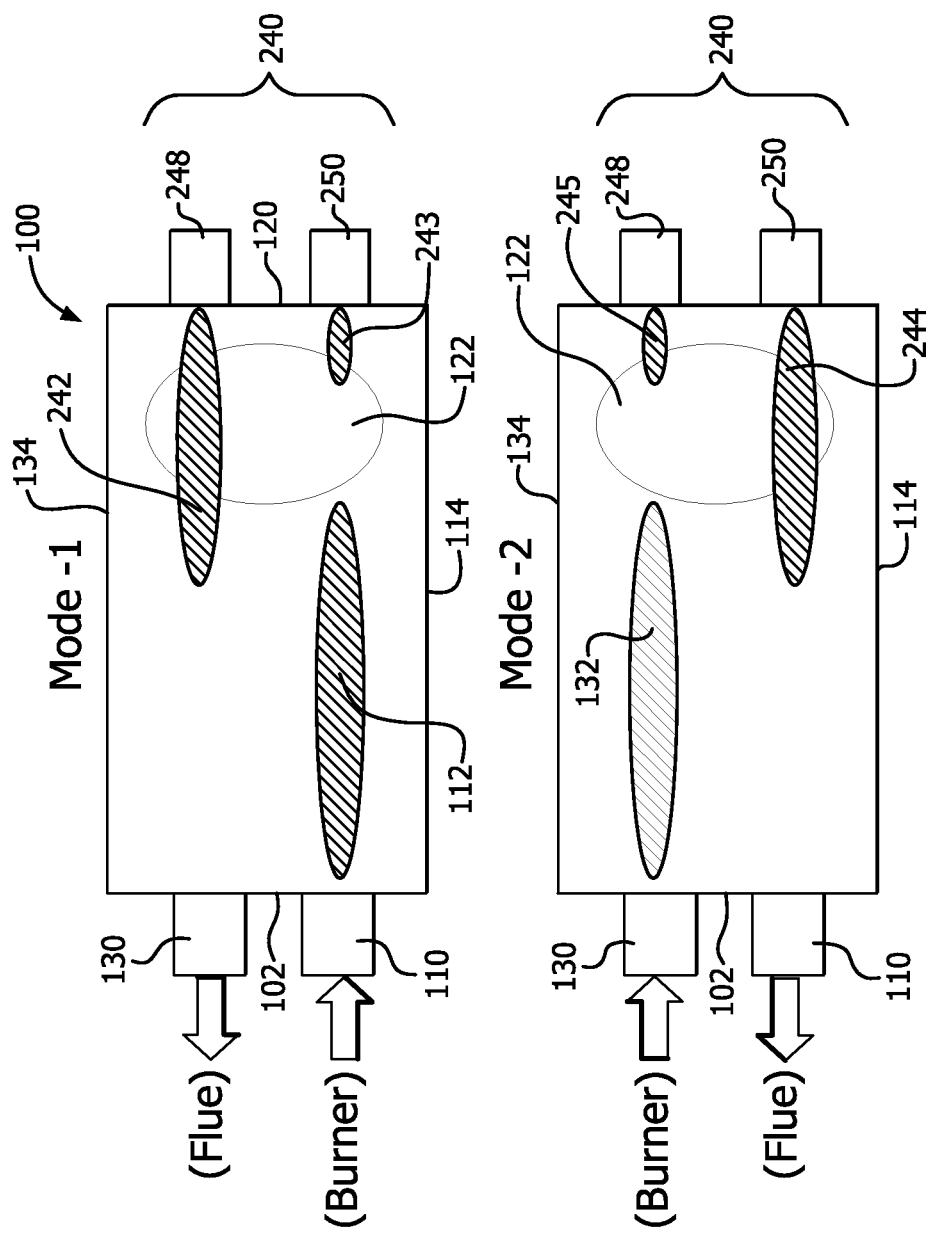
FIG. 12 is a schematic plan view of an end-port regenerative furnace, showing a configuration of an end wall mounted selective boost burner having multiple burner elements divided among two or more separate housings.

The embodiment of FIG. 12 is operated essentially the same as the embodiment of FIG. 11, except that the burner elements 20 of the boost burner 240 may be mounted in two separate housings 248, 250 with at least one burner element 20 in each housing 248, 250, rather than in a common housing as in FIG. 11. The burner elements 20 are otherwise operated in the same manner as in the embodiment of FIG. 11.

Figure 13:
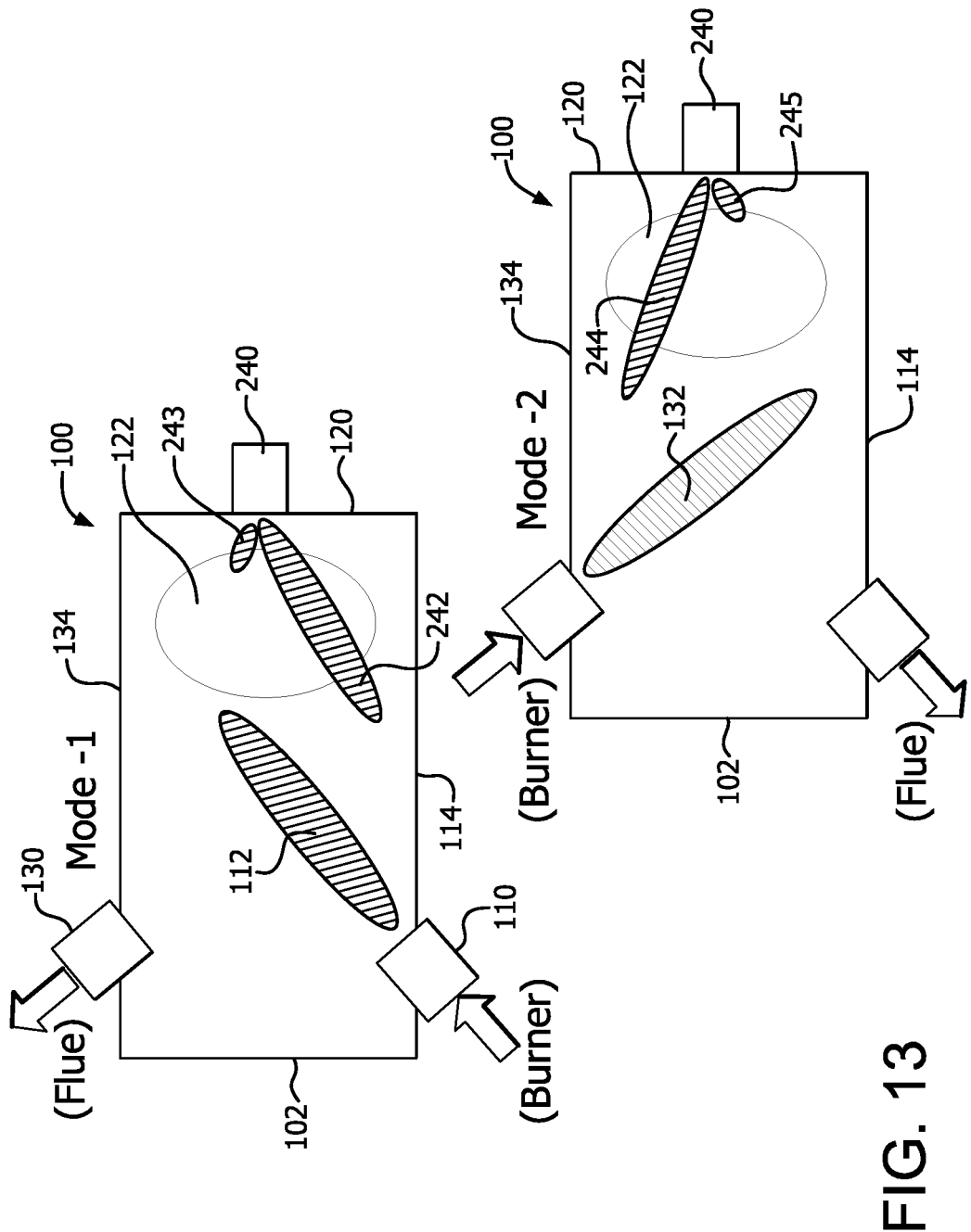
FIG. 13 is a schematic plan view of an angled side-port regenerative furnace showing a configuration of an end wall mounted selective boost burner having multiple burner elements contained in a single housing.
Figure 14:
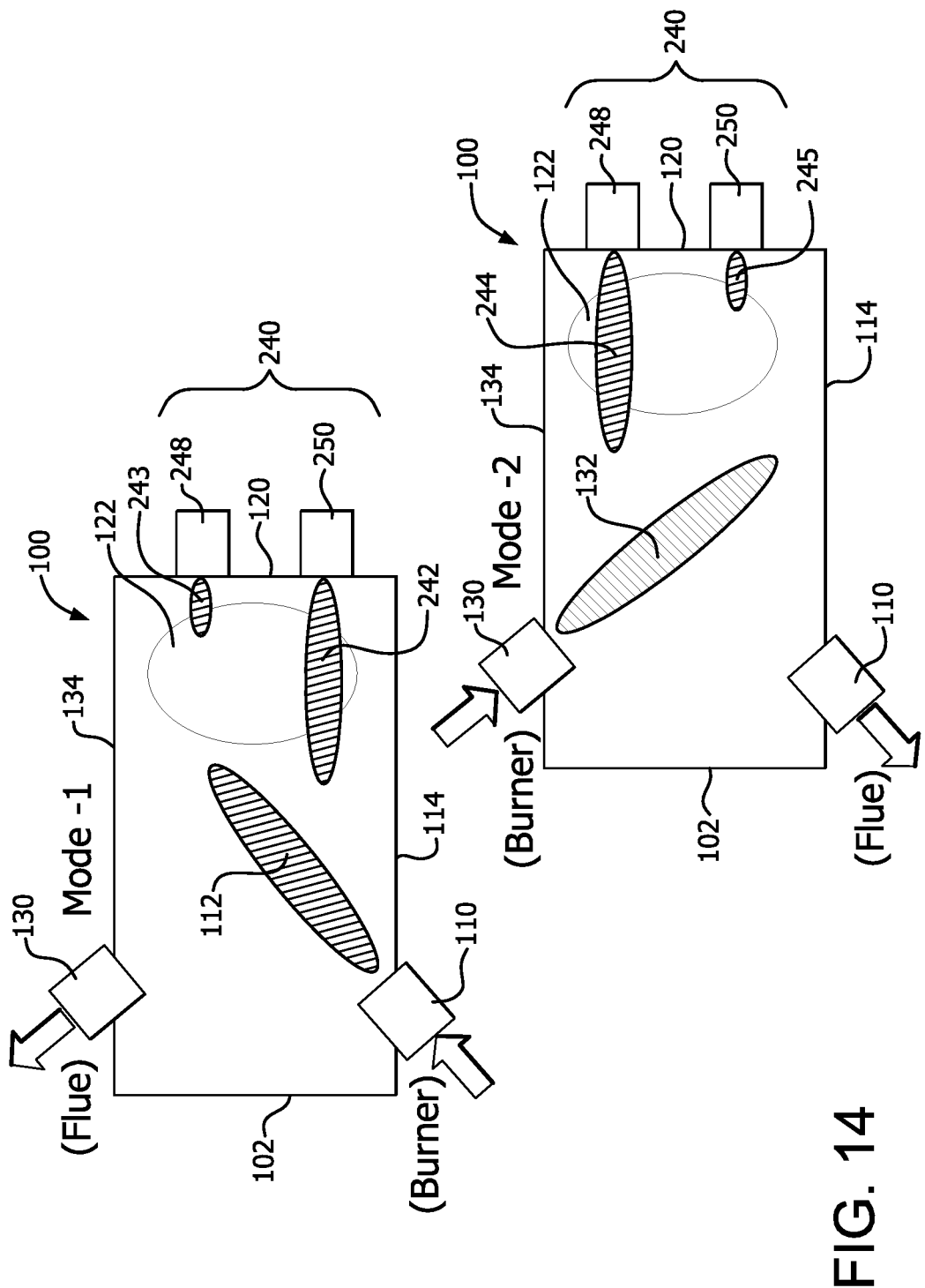
FIG. 14 is a schematic plan view of an angled side-port regenerative furnace, showing a configuration of an end wall mounted selective boost burner having multiple burner elements divided among two or more separate housings.

FIGS. 13 and 14 show an alternate application of a selective boost burner 240 in a regenerative furnace 100 having angled side wall regenerator ports 310, 330 positioned near one end wall 102 of the furnace 100. The regenerator port 110 is positioned in the side wall 114 and the regenerator port 130 is positioned in the side wall 134. The air-fuel flames 312, 332 from the respective regenerator ports 310, 330 are directed generally diagonally across the furnace 100, with the flame 312 from the regenerator port 310 extending at an angle having an axial component toward the far end wall 120 and a transverse component toward the opposite side wall 114, and the flame 112 from the regenerator port 110 extending at an angle having an axial component toward the far end wall 120 and a transverse component toward the opposite side wall 134.

In the configuration of FIGS. 13 and 14, a selective oxy-fuel boost burner 240 is mounted in the end wall 120, either in a single housing containing all of the burner elements 20 (FIG. 13) or in two separate housings 248, 250 each containing at least one burner element 20 (FIG. 14). As in the configurations of FIGS. 11 and 12, the boost burner 240 may be configured in any of the configurations described above for boost burners 10 and 11, and in particular the boost burner 240 is preferably configured with at least two burner elements 20 angled outward as shown for example in FIG. 5B(c) or 5B(d), or with at least two burner elements 20 spaced laterally apart and directed substantially perpendicularly with respect to the end wall 120. In either orientation, whether angled outward or perpendicular, the burner elements may be of any shape. In addition, in either orientation, the burner elements may also be angled downward toward the charge or upward away from the charge, if desired. Multiple rows of co-linear burner elements 20 may also be used as in FIG. 5B(f).

The boost burners 240 of FIGS. 13 and 14 each have multiple flame zones, with one flame zone associated with each burner element 20. For example, in a boost burner 240 with two flame elements 20, one burner element 20 is oriented to have a flame zone 242 that fires into a complimentary region of the furnace 100 with respect to the regenerator port burner 110, and thus does not substantially interact with the flame zone 112 of the regenerator port burner 110. And the other burner element 20 is oriented to have a flame zone 244 that fires into a complimentary region of the furnace 100 with respect to the regenerator port burner 130 and thus does not substantially interact with the flame zone 132 of the regenerator port burner 130.

The controller 105 is configured and programmed to synchronize the selective active/passive firing of the respective burner elements 20 in the boost burner 240 with the alternate firing/exhausting of the regenerator ports 110, 130. At any given time, the controller 105 first identifies which regenerator port 110, 130 is currently firing and which is currently exhausting. Then, the controller 105 sets or maintains in an active mode the one or more burner elements 20 whose flame zones fire into complimentary regions of the furnace with respect to the flame zone of the regenerator port currently firing, and sets or maintains in a passive mode the one or more burner elements 20 whose flame zones would overlap or interact with the flame zone of the regenerator port current firing.

Similarly to the furnace configuration discussed with reference to FIGS. 11 and 12, the furnace 100 in FIGS. 13, 14, and 15 has a cold spot 122 near the far end wall 120. In addition, a secondary cold spot 121 may exist near the near end wall 102 in a region that does not receive a flow of combustion products from the regenerator port burners 110, 130. While the configurations of FIGS. 13 and 14 are not able to effectively address the secondary cold spot 121, a roof-mounted burner as in FIG. 15 can simultaneously add the heat of supply oxy-fuel combustion to both cold spots 121, 122. For the roof-mounted application of FIG. 15, a boost burner 240 as in FIG. 1A or 1B is one preferred arrangement.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. An oxy-fuel boost burner for a regenerative furnace having a pair of regenerator ports configured to alternately fire into and exhaust from the furnace, the boost burner comprising:
    at least two burner elements, wherein at least one of the burner elements corresponds to each of the regenerator ports such that a regenerator port and its corresponding at least one burner element are positioned to fire into complimentary regions of the furnace, each burner element comprising:
        a selective distribution nozzle configured to flow a first reactant; and
        a proportional distribution nozzle configured to flow a second reactant; and
    a controller programmed:
        to identify which regenerator port is currently firing and which regenerator port is currently exhausting;
        to control the second reactant flow to be substantially proportionally distributed to the proportional distribution nozzles; and
        to independently control the first reactant flow to each selective distribution nozzle such that the at least one burner element corresponding to the currently firing regenerator port is active and the at least one burner element corresponding to the currently exhausting regenerator port is passive, wherein first reactant flow in the selective distribution nozzle of an active burner element is greater than an average first reactant flow to the selective distribution nozzles and first reactant flow in the selective distribution nozzle of a passive burner element is less than the average first reactant flow to the selective distribution nozzles;
    wherein the second reactant is substantially proportionally distributed to the proportional distribution nozzles; and
    wherein the first reactant is one of a fuel and an oxidant and wherein the second reactant is the other of a fuel and an oxidant.

2. The boost burner of claim 1, wherein the proportional distribution nozzle is an annular nozzle surrounding the selective distribution nozzle.

3. The boost burner of claim 1, wherein the first reactant is a fuel and the second reactant is an oxidant.

4. The boost burner of claim 3, further comprising:
    at least one staging nozzle spaced apart from each of the burner elements and configured to flow a secondary oxidant;
    wherein the controller is further programmed to control a staging ratio to be less than or equal to about 75%, wherein the staging ratio is the ratio of the oxygen contained in the secondary oxidant flow to the sum of the oxidant flowed through the proportional distribution nozzles and the staging nozzle.

5. The boost burner of claim 1, wherein the regenerator ports are mounted in an end wall of the furnace, and wherein the boost burner is mounted in an opposite end wall of the furnace.

6. The boost burner of claim 1, wherein the regenerator ports are positioned in opposite sidewalls near an end wall of the furnace, each regenerator port being at a non-perpendicular angle to its respective sidewall, and wherein the boost burner is mounted in an opposite end wall of the furnace.

7. The boost burner of claim 1, wherein the regenerator ports are positioned in opposite sidewalls near an end wall of the furnace, each regenerator port being at a non-perpendicular angle to its respective sidewall, and wherein the boost burner is mounted in a roof of the furnace.

8. The boost burner of claim 1, wherein the burner elements are mounted in the same housing.

9. The boost burner of claim 1, wherein at least one of the burner elements is mounted in a separate housing from at least one other of the burner elements.

10. The boost burner of claim 1, wherein the controller is programmed to control first reactant flow to a passive selective distribution nozzle to be greater than zero and less than or equal to half the first reactant flow rate of an active selective distribution nozzle.

11. The boost burner of claim 1,
wherein the oxidant flowing through the burner elements has an oxygen concentration of equal to or greater than about 23%.

12. The boost burner of claim 1,
wherein the selective distribution nozzle of an active burner element has an active jet flow rate and wherein the selective distribution nozzle of a passive burner element has a passive jet flow rate; and
wherein the controller is programmed to control the ratio of the active jet flow rate to the passive jet flow rate to be from about 5 to about 40.

13. The boost burner of claim 1, wherein a passive burner element has an equivalence ratio of from about 0.2 to about 1, and wherein an active burner element has an equivalence ratio of from about 1 to about 10, wherein the equivalence ratio is the ratio of theoretical stoichiometric oxidant flow required to combust the actual fuel flow through the burner element to actual oxidant flow through the burner element.

14. A method of operating the boost burner of claim 1 in a regenerative furnace having a pair of regenerator ports configured to alternately fire into and exhaust from the furnace, the method comprising:
flowing a second reactant at a second reactant flow rate through each of the proportional distribution nozzles;
identifying which regenerator port is currently firing and which regenerator port is current exhausting;
selecting at least one of the selective distribution nozzles to be active and at least one of the selective distribution nozzles to be passive, the at least one active distribution nozzle having a flame zone that is complimentary to a flame zone of the regenerator port currently firing;
flowing the second reactant substantially proportionally to each of the proportional distribution nozzles;
flowing the first reactant at an active jet flow rate through the at least one active selective distribution nozzle; and
flowing the first reactant at a passive jet flow rate through the at least one passive selective distribution nozzle;
wherein the active jet flow rate is greater than an average flow rate through the selective distribution nozzles and the passive jet flow rate is less than the average flow rate through the selective distribution nozzles.

\* \* \* \* \*